(12) United States Patent
Giannakis et al.

(10) Patent No.: US 11,303,377 B2
(45) Date of Patent: *Apr. 12, 2022

(54) ESTIMATING FREQUENCY-OFFSETS AND MULTI-ANTENNA CHANNELS IN MIMO OFDM SYSTEMS

(71) Applicant: Regents of the University of Minnesota, Minneapolis, MN (US)

(72) Inventors: Georgios B. Giannakis, Minnetonka, MN (US); Xiaoli Ma, Auburn, AL (US)

(73) Assignee: Regents of the University of Minnesota, Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/876,316

(22) Filed: May 18, 2020

(65) Prior Publication Data
US 2020/0412472 A1 Dec. 31, 2020

Related U.S. Application Data

(63) Continuation of application No. 15/162,978, filed on May 24, 2016, now Pat. No. 10,700,800, which is a (Continued)

(51) Int. Cl.
*H04L 25/02* (2006.01)
*H04L 27/26* (2006.01)
(Continued)

(52) U.S. Cl.
CPC .......... *H04J 11/0063* (2013.01); *H04B 7/046* (2013.01); *H04B 7/0413* (2013.01); (Continued)

(58) Field of Classification Search
CPC ............ H04L 27/2626; H04L 27/2613; H04L 27/2657; H04L 27/2671; H04L 27/2675; (Continued)

(56) References Cited

U.S. PATENT DOCUMENTS

| 5,127,051 A | 6/1992 | Chan et al. |
| 5,263,051 A | 11/1993 | Eyuboglu |

(Continued)

FOREIGN PATENT DOCUMENTS

| AU | 2003/200323 | 4/2003 |
| DE | 19609909 | 9/1997 |

(Continued)

OTHER PUBLICATIONS

U.S. Appl. No. 60/334,363, filed Nov. 29, 2001, Gupta.
(Continued)

*Primary Examiner* — Ted M Wang
(74) *Attorney, Agent, or Firm* — Fish & Richardson P.C.

(57) ABSTRACT

Techniques are described for carrier frequency offset (CFO) and channel estimation of orthogonal frequency division multiplexing (OFDM) transmissions over multiple-input multiple-output (MIMO) frequency-selective fading channels. A wireless transmitter forms blocks of symbols by inserting training symbols within two or more blocks of information-bearing symbols. The transmitter applies a hopping code to each of the blocks of symbols to insert a null subcarrier at a different position within each of the blocks of symbols, and a modulator outputs a wireless signal in accordance with the blocks of symbols. A receiver receives the wireless signal and estimates the CFO, and outputs a stream of estimated symbols based on the estimated CFO.

15 Claims, 12 Drawing Sheets

Related U.S. Application Data continuation of application No. 14/289,294, filed on May 28, 2014, now Pat. No. 9,374,143, which is a continuation of application No. 13/783,039, filed on Mar. 1, 2013, now Pat. No. 8,774,309, which is a continuation of application No. 13/777,993, filed on Feb. 26, 2013, now Pat. No. 8,718,185, which is a continuation of application No. 13/301,482, filed on Nov. 21, 2011, now Pat. No. 8,588,317, which is a continuation of application No. 10/850,961, filed on May 21, 2004, now Pat. No. 8,064,528.

(60) Provisional application No. 60/472,297, filed on May 21, 2003.

(51) Int. Cl.
   H04J 11/00 (2006.01)
   H04B 7/0413 (2017.01)
   H04B 7/0456 (2017.01)
   H04B 7/06 (2006.01)
   H04L 5/00 (2006.01)

(52) U.S. Cl.
   CPC ............. *H04B 7/063* (2013.01); *H04B 7/066* (2013.01); *H04L 5/0016* (2013.01); *H04L 25/0202* (2013.01); *H04L 25/0206* (2013.01); *H04L 25/0228* (2013.01); *H04L 25/0242* (2013.01); *H04L 27/2607* (2013.01); *H04L 27/2613* (2013.01); *H04L 27/2626* (2013.01); *H04L 27/2657* (2013.01); *H04L 27/2671* (2013.01); *H04L 27/2672* (2013.01); *H04L 27/2675* (2013.01); *H04L 27/2692* (2013.01); *H04L 27/2695* (2013.01)

(58) Field of Classification Search
   CPC ............. H04L 27/2692; H04L 27/2672; H04L 25/0206; H04L 25/0228; H04L 25/0242; H04L 25/0202; H04B 7/0413; H04B 7/046; H04B 7/066
   USPC ......................................................... 375/299
   See application file for complete search history.

(56) References Cited

U.S. PATENT DOCUMENTS

| | | |
|---|---|---|
| 5,406,585 A | 4/1995 | Rohani et al. |
| 5,416,801 A | 5/1995 | Chouly et al. |
| 5,629,621 A | 5/1997 | Goldfine et al. |
| 5,636,253 A | 6/1997 | Spruyt |
| 5,708,665 A | 1/1998 | Luthi et al. |
| 5,732,113 A | 3/1998 | Schmidl et al. |
| 5,793,875 A | 8/1998 | Lehr et al. |
| 5,867,478 A | 2/1999 | Baum et al. |
| 5,872,776 A | 2/1999 | Yang |
| 6,005,876 A | 12/1999 | Cimini et al. |
| 6,088,408 A | 7/2000 | Calderbank et al. |
| 6,144,711 A | 11/2000 | Raleigh et al. |
| 6,163,524 A | 12/2000 | Magnusson et al. |
| 6,188,717 B1 | 2/2001 | Kaiser et al. |
| 6,298,035 B1 | 10/2001 | Heiskala |
| 6,377,632 B1 | 4/2002 | Paulraj et al. |
| 6,441,786 B1 | 8/2002 | Jasper et al. |
| 6,442,214 B1 | 8/2002 | Boleski et al. |
| 6,449,245 B1 | 9/2002 | Ikeda et al. |
| 6,449,246 B1 | 9/2002 | Barton et al. |
| 6,487,253 B1 | 11/2002 | Jones, IV et al. |
| 6,519,291 B1 | 2/2003 | Dagdeviren et al. |
| 6,522,700 B1 | 2/2003 | Zimmermann et al. |
| 6,549,587 B1 | 4/2003 | Li et al. |
| 6,549,592 B1 | 4/2003 | Jones et al. |
| 6,578,170 B1 | 6/2003 | Piret et al. |
| 6,580,761 B2 | 6/2003 | Laroia et al. |
| 6,633,614 B1 | 10/2003 | Barton et al. |
| 6,678,263 B1 | 1/2004 | Hammons et al. |
| 6,707,856 B1 | 3/2004 | Gardner et al. |
| 6,711,382 B2 | 3/2004 | Chiba et al. |
| 6,717,908 B2 | 4/2004 | Vijayan et al. |
| 6,754,290 B1 | 6/2004 | Halter et al. |
| 6,771,706 B2 | 8/2004 | Ling et al. |
| 6,792,049 B1 | 9/2004 | Boa et al. |
| 6,816,557 B2 | 11/2004 | Kuchi et al. |
| 6,850,481 B2 | 2/2005 | Wu et al. |
| 6,865,175 B1 | 3/2005 | Ritter |
| 6,885,708 B2 | 4/2005 | Thomas et al. |
| 6,928,046 B1 | 8/2005 | Sajadieh et al. |
| 6,928,047 B1 | 8/2005 | Xia |
| 6,944,235 B2 | 9/2005 | Ophir |
| 6,954,481 B1 | 10/2005 | Laroia et al. |
| 6,959,010 B1 | 10/2005 | Bahrenburg et al. |
| 6,959,050 B2 | 10/2005 | Baum et al. |
| 6,961,388 B2 | 11/2005 | Ling et al. |
| 7,009,931 B2 | 3/2006 | Ma et al. |
| 7,065,156 B1 | 6/2006 | Kuchi |
| 7,065,371 B1 | 6/2006 | Kleinerman |
| 7,079,824 B2 | 7/2006 | DeCourville et al. |
| 7,088,671 B1 | 8/2006 | Monsen |
| 7,092,352 B2 | 8/2006 | Shattil |
| 7,095,790 B2 | 8/2006 | Krishnan et al. |
| 7,099,353 B2 | 8/2006 | Hosur |
| 7,103,325 B1 | 9/2006 | Jia et al. |
| 7,139,321 B2 | 11/2006 | Giannakis et al. |
| 7,149,254 B2 | 12/2006 | Sampath |
| 7,154,936 B2 | 12/2006 | Bjerke et al. |
| 7,158,579 B2 | 1/2007 | Hottinen |
| 7,158,585 B2 | 1/2007 | Jones et al. |
| 7,161,973 B2 | 1/2007 | Ghosh |
| 7,197,084 B2 | 3/2007 | Ketchum et al. |
| 7,215,636 B2 | 5/2007 | Seo et al. |
| 7,218,689 B2 | 5/2007 | Gupta |
| 7,236,539 B2 | 6/2007 | Deng et al. |
| 7,248,559 B2 | 7/2007 | Ma et al. |
| 7,251,291 B1 * | 7/2007 | Dubuc ................. H04L 5/0048 375/285 |
| 7,254,196 B2 | 8/2007 | Kriedte et al. |
| 7,257,166 B2 | 8/2007 | Kim |
| 7,260,768 B1 | 8/2007 | Matsumoto et al. |
| 7,293,224 B2 | 11/2007 | Kim et al. |
| 7,301,893 B2 | 11/2007 | Onggosanusi et al. |
| 7,308,033 B2 | 12/2007 | Yu et al. |
| 7,308,063 B2 | 12/2007 | Priotti |
| 7,317,750 B2 | 1/2008 | Shattil |
| 7,327,800 B2 | 2/2008 | Opera et al. |
| 7,336,597 B2 | 2/2008 | Maltsev et al. |
| 7,336,627 B1 | 2/2008 | Hasegawa et al. |
| 7,382,718 B2 | 6/2008 | Chang et al. |
| 7,386,057 B2 | 6/2008 | Ito et al. |
| 7,430,243 B2 | 9/2008 | Giannakis et al. |
| 7,436,757 B1 | 10/2008 | Wilson et al. |
| 7,436,896 B2 | 10/2008 | Hottinen et al. |
| 7,460,466 B2 | 12/2008 | Lee et al. |
| 7,463,577 B2 | 12/2008 | Sudo et al. |
| 7,483,476 B2 | 1/2009 | El-Gamal et al. |
| 7,542,504 B2 | 6/2009 | Chang et al. |
| 7,606,316 B1 | 10/2009 | Narasimhan |
| 7,633,993 B2 | 12/2009 | Ojard |
| 7,656,936 B2 | 2/2010 | Li et al. |
| 7,672,384 B2 | 3/2010 | Giannakis et al. |
| 7,684,501 B2 | 3/2010 | Liu et al. |
| 7,693,041 B2 | 4/2010 | Joo et al. |
| 7,778,337 B2 | 8/2010 | Tong et al. |
| 7,843,888 B1 | 11/2010 | Wang et al. |
| 7,912,150 B2 | 3/2011 | Kim et al. |
| 7,933,343 B2 | 8/2011 | Emami et al. |
| 8,064,528 B2 | 11/2011 | Giannakis et al. |
| 8,121,022 B2 | 2/2012 | Li et al. |
| 8,254,246 B2 | 8/2012 | Ma et al. |
| 8,428,182 B2 | 4/2013 | Murakami et al. |
| 8,588,317 B2 | 11/2013 | Giannakis et al. |
| 8,594,247 B2 | 11/2013 | Jia et al. |
| 8,718,185 B2 | 5/2014 | Giannakis et al. |

(56) References Cited

U.S. PATENT DOCUMENTS

| | | | |
|---|---|---|---|
| 8,774,309 | B2 | 7/2014 | Giannakis et al. |
| RE45,230 | E | 11/2014 | Giannakis et al. |
| 8,929,487 | B1 | 1/2015 | Narasimhan |
| 9,374,143 | B2 | 6/2016 | Giannakis et al. |
| 2001/0036232 | A1 | 11/2001 | Betts |
| 2002/0034258 | A1 | 3/2002 | Kuzminskiy et al. |
| 2002/0051498 | A1 | 5/2002 | Thomas et al. |
| 2002/0080887 | A1 | 6/2002 | Jeong et al. |
| 2002/0097813 | A1* | 7/2002 | Vaidyanathan ....... H04L 27/066 375/326 |
| 2002/0106004 | A1 | 8/2002 | Tan |
| 2002/0122381 | A1 | 9/2002 | Wu et al. |
| 2002/0122502 | A1 | 9/2002 | El-Gamal et al. |
| 2002/0126740 | A1 | 9/2002 | Giannakis et al. |
| 2002/0136327 | A1 | 9/2002 | El-Gamal et al. |
| 2002/0146078 | A1 | 10/2002 | Gorokhov et al. |
| 2002/0159422 | A1 | 10/2002 | Li et al. |
| 2002/0176485 | A1 | 11/2002 | Hudson |
| 2002/0181390 | A1 | 12/2002 | Mody et al. |
| 2002/0181509 | A1* | 12/2002 | Mody ................. H04L 1/0618 370/480 |
| 2002/0191703 | A1 | 12/2002 | Ling et al. |
| 2003/0021351 | A1 | 1/2003 | Talwar |
| 2003/0072254 | A1 | 4/2003 | Ma et al. |
| 2003/0072255 | A1 | 4/2003 | Ma et al. |
| 2003/0072397 | A1 | 4/2003 | Kim et al. |
| 2003/0072452 | A1 | 4/2003 | Mody et al. |
| 2003/0073464 | A1 | 4/2003 | Giannakis et al. |
| 2003/0076777 | A1 | 4/2003 | Stuber et al. |
| 2003/0081569 | A1 | 5/2003 | Sexton et al. |
| 2003/0112745 | A1 | 6/2003 | Zhuang et al. |
| 2003/0210750 | A1 | 7/2003 | Walton et al. |
| 2003/0156594 | A1 | 8/2003 | Trott et al. |
| 2003/0169824 | A1 | 9/2003 | Chayat |
| 2004/0001429 | A1 | 1/2004 | Ma et al. |
| 2004/0013211 | A1 | 1/2004 | Lindskog et al. |
| 2004/0037214 | A1 | 2/2004 | Blasco Claret et al. |
| 2004/0120410 | A1 | 6/2004 | Priotti |
| 2004/0166887 | A1 | 8/2004 | Laroia et al. |
| 2004/0190636 | A1 | 9/2004 | Oprea |
| 2005/0018782 | A1 | 1/2005 | Costa et al. |
| 2005/0058217 | A1 | 3/2005 | Sandhu et al. |
| 2005/0123082 | A1 | 6/2005 | Paul |
| 2007/0053282 | A1 | 3/2007 | Tong et al. |
| 2007/0217546 | A1 | 9/2007 | Sandell et al. |
| 2008/0240204 | A1* | 10/2008 | Heidari-Bateni ... H04L 27/2662 375/132 |
| 2013/0223562 | A1 | 8/2013 | Giannakis et al. |
| 2015/0288430 | A1 | 10/2015 | Giannakis et al. |
| 2016/0269138 | A1 | 9/2016 | Giannakis et al. |
| 2017/0019160 | A1 | 1/2017 | Giannakis et al. |

FOREIGN PATENT DOCUMENTS

| | | |
|---|---|---|
| EP | 0083660 | 2/1989 |
| EP | 0397537 | 11/1990 |
| EP | 0566257 | 10/1993 |
| EP | 0729250 | 8/1996 |
| EP | 0767546 | 4/1998 |
| EP | 0854581 | 7/1998 |
| EP | 0905920 | 3/1999 |
| EP | 0915586 | 5/1999 |
| EP | 0948140 | 6/1999 |
| EP | 0998045 | 5/2000 |
| EP | 1085688 | 3/2001 |
| EP | 1148673 | 10/2001 |
| EP | 1156598 | 11/2001 |
| EP | 1158716 | 11/2001 |
| EP | 1172959 | 1/2002 |
| EP | 1185001 | 3/2002 |
| EP | 1185048 | 3/2002 |
| EP | 1249980 | 10/2002 |
| EP | 1255408 | 11/2002 |
| EP | 1276288 | 1/2003 |
| EP | 1283614 | 2/2003 |
| EP | 1333607 | 8/2003 |
| EP | 1386457 | 2/2004 |
| EP | 1515471 | 3/2005 |
| WO | WO 1996/02100 | 1/1996 |
| WO | WO 1997/37470 | 10/1997 |
| WO | WO 1998/58496 | 12/1998 |
| WO | WO 1998/059450 | 12/1998 |
| WO | WO 2000/74248 | 12/2000 |
| WO | WO 2001/39392 | 5/2001 |
| WO | WO 2001/56182 | 8/2001 |
| WO | WO 2001/65760 | 9/2001 |
| WO | WO 2001/95531 | 12/2001 |
| WO | WO 2001/97474 | 12/2001 |
| WO | WO 2002/05506 | 1/2002 |
| WO | WO 2002/41550 | 5/2002 |
| WO | WO 2002/45329 | 6/2002 |
| WO | WO 2002/49305 | 6/2002 |
| WO | WO 2002/052807 | 7/2002 |
| WO | WO 2002/062002 | 8/2002 |
| WO | WO 2002/078211 | 10/2002 |
| WO | WO 2002/093779 | 11/2002 |
| WO | WO 2002/098051 | 12/2002 |
| WO | WO 2002/103926 | 12/2002 |
| WO | WO 2003/015334 | 2/2003 |
| WO | WO 2003/017558 | 2/2003 |
| WO | WO 2003/026193 | 3/2003 |
| WO | WO 2003/028270 | 4/2003 |
| WO | WO 2003/041300 | 5/2003 |
| WO | WO 2003/047118 | 6/2003 |
| WO | WO 2003/049397 | 6/2003 |
| WO | WO 2003/081938 | 10/2003 |
| WO | WO 2003/084092 | 10/2003 |
| WO | WO 2003/085875 | 10/2003 |

OTHER PUBLICATIONS

U.S. Appl. No. 60/470,832, filed May 14, 2003, Narasimhan.
U.S. Appl. No. 60/449,729, p. 1-25, filed Feb. 24, 2003.
U.S. Appl. No. 60/472,297, 6 pages, filed May 21, 2003.
3rd Generation Partnership Project; Technical Specification Group Radio Access Network; Physical layer procedures (FDD) (Release 1999) 3GPP TS 25.214 V3.5.0 (Dec. 2000).
3rd Generation Partnership Project; Technical Specification Group Radio Access Network; Multiplexing and channel coding (FDD) (Release 1999) 3GPP TS 25.212 V3.5.0 (Dec. 2000).
Adireddy et al, "Optimal Placement of Training for Frequency-Selective Block-Fading Channels," IEEE Transactions On Information Theory, vol. 48, No. 8, pp. 2338-2353, Aug. 2002.
Adireddy et al., "Detection With Embedded Known Symbols: Optimal Symbol Placement and Equalization," In Procedures of International Conference ASSP, vol. 5, Istanbul, Turkey, pp. 2541-2544, Jun. 2000.
Adireddy et al., "Optimal Embedding of Known Symbols for OFDM," in Procedures International Conference, ASSP, vol. 4, Salt Lake City, UT, May 2001.
Adireddy et al., "Optimal Placement of Training for Frequency-Selective Block-Fading Channels," *IEEE Transactions on Information Theory.*, vol. 48(8), Aug. 2002.
Agrawal et al., "Space-Time Coded OFDM High Data-Rate Wireless Communication Over Wideband Channels," in Procedures on Vehicle Technology Conference, Ottawa, ON, Canada, pp. 2232-2236, May 18-21, 1998.
Alamouti, "A Simple Transmit Diversity Technique For Wireless Communications," IEEE Journal on Select Areas In Communications, vol. 16, No. 8, pp. 1451-1458, Oct. 1998.
Al-Dhahir et al., "Block Transmission Over Dispersive Channels: Transmit Filter Optimization and Realization, and MMSE-DFE Receiver Performance," IEEE Transactions Information Theory, vol. 42, No. 1, pp. 137-160, Jan. 1996.
Baltersee et al., "Achievable Rate of MIMO Channels With Data-Aided Channel Estimation and Perfect interleaving," IEEE Journal on Selected Areas In Communication, vol. 19, No. 12, 2358-2368, Dec. 2001.

(56) References Cited

OTHER PUBLICATIONS

Ban et al., "Transmitter Precoding with Multiple Transmit/Receive Antennas for High Data Rate Communication in Bandwidth-limited Channels," *IEEE VTS 50th Vehicular Technology Conference.*, vol. 3, Sep. 19-22, 1999.
Barbarossa et al., "Channel Independent Non-data aided synchronization of generalized multiuser OFDM," *2001 IEEE International Conference on Acoustics, Speech, and Signal Processing.*, (vol. 4 ), May 7-11, 2001.
Barbarossa et al., "Channel-independent synchronization of orthogonal frequency division multiple access systems." IEEE Journal on Selected Areas in Communications, 20.2: 474-486, Feb. 2002.
Barbarossa et al., "Time and Frequency Synchronization of Orthogonal Frequency Division Multiple Access Systems," *IEEE International Conference on Communications.*, vol. 6, Jun. 11-14, 2001.
Barhumi et al., "Optimal Training Sequences for Channel Estimation in MIMO OFDM Systems in Mobile Wireless Communications," Procedures of International Zurich Seminar on Access, Transmission, Networking of Broadband Communications, 6 pgs., ETH Zurich, Switzerland, Feb. 19-21, 2002.
Baro et al., "Improved Codes for Space-Time Trellis Coded Modulation," IEEE Communication Letters, vol. 4, pp. 1-3, Jan. 2000.
Benedetto et al., "Principles of Digital Transmission with Wireless Applications," Kluwer Academic/Plenum Publishers, 1 pg., 1999.
Bengtsson and Ottersten., "Uplink and Downlink Beamforming for Fading Channels," *1999 2nd IEEE Workshop on Signal Processing Advances in Wireless Communications.*, May 9-12, 1999.
Bhashyam et al., "Time-Selective Signaling and Reception for Communication Over Multipath Fading Channels," IEEE Transactions On Communications, vol. 48, No. 1, pp. 1-34, Jan. 2000.
Biglieri et al., "Fading Channels: Information-Theoretic and Communications Aspects," IEEE Transactions on Information Theory, vol. 44, No. 6, pp. 2619-2692, Oct. 1998.
Bingham, "Multicarrier Modulation for Data Transmission: An Idea Whose Time Has Come," IEEE Communications Magazine, pp. 5-14, May 1990.
Bolcskei et al., "Blind Channel Identification and Equalization in OFDM-Based Multiantenna Systems," IEEE Transactions on Signal Processing, vol. 50, No. 1, pp. 96-109, Jan. 2002.
Bolcskei et al., "Space-Frequency Coded Broadband OFDM Systems," Invited paper, presented at IEEE WCNC 2000, Chicago, pp. 1-6, Sep. 2000.
Bolcskei et al., "Space-Frequency Codes for Broadband Fading Channels," in International Symposium Information Theory, Washington, DC, 1 page, Jun. 2001.
Borah et al., "Frequency-Selective Fading Channel Estimation with a Polynomial Time-Varying Channel Model," IEEE Transactions On Communications, vol. 47, No. 6, pp. 862-873, Jun. 1999.
Boutros and Viterbo., "Signal Space Diversity: A Power- and Bandwidth-Efficient Diversity Technique for the Rayleigh Fading Channel," *IEEE Transactions on Information Theory*, vol. 44(4), Jul. 1998.
Boutros et al., "Signal Space Diversity: A Power And Bandwidth Efficient Diversity Technque for the Rayleigh Fading Channel," IEEE Transactions Information Theory, vol. 44, pp. 1-34, Jul. 1998.
Budianu et al., "Channel Estimation for Space-Time Orthogonal Block Codes," IEEE Transactions on Signal Processing, vol. 50, No. 10, pp. 2515-2528, Oct. 2002.
Caire et al., "Bit-Interleaved Coded Modulation," IEEE Transactions on Information Theory, vol. 44, No. 3, pp. 927-946, May 1998.
Caire et al., "Bit-Interleaved Coded Modulation," *IEEE Transactions on Information Theory.*, vol. 44(3), May 1998.
Cavers, "An Analysis of Pilot Symbol Assisted Modulation for Rayleigh Fading Channels," IEEE Transactions On Vehicular Technology, vol. 40, No. 4, pp. 686-693, Nov. 1991.
Cavers, "Pilot Symbol Assisted Modulation and Differential Detection in Fading and Delay Spread," IEEE Transactions On Communications, vol. 43, No. 7, pp. 2206-2212, Jul. 1995.

Choi et al., "Multiple Input/Multiple Output (MIMO) Equalization for Space-Time Block Coding," IEEE Pacific Rim Conference on Communications, Computers and Signal Processing, pp. 341-344, 1999.
Choi et al., "Space-Time Block Codes Over Frequency Selective Rayleigh Fading Channels," IEEE VTC, vol. 5, pp. 2541-2545, 1999.
Clark et al., "Adaptive Channel Estimator for an HF Radio Link," IEEE Transactions On Communications, vol. 37, No. 9, pp. 918-926, Sep. 1989.
Clark, "Adaptive Frequency-Domain Equalization and Diversity Combining for Broadband Wireless Communications", IEEE Journal on Selected Areas in Communications, vol. 16, No. 8, pp. 1385-1395, Oct. 1998.
Court Order Granting Ericsson's Motion to Intervene, dated Mar. 30, 2016, 3 pages.
Courville et al., "Blind Equalization of OFDM Systems based on the Minimization of a Quadratic Criterion," Proc. of ICC, Dallas, USA, vol. 3, pp. 1318-1321, Jun. 1996.
CV of Vijay Madisetti, 26 pages.
Damen et al., "Lattice Code Decoder for Space-Time Codes," IEEE Communication Letters, vol. 4, No. 5, pp. 161-163, May 2000.
Dammann and Kaiser., "Low Complex Standard Conformable Antenna Diversity Techniques for OFDM Systems and its Application to the DVB-T System," *Proceedings of the 4th International Conference on Source and Channel Coding.*, Jan. 2002.
Dammann and Kaiser., "Standard Conformable Antenna Diversity Techniques for OFDM and its Application to the DVB-T System," *IEEE Global Telecommunications Conference.*, Nov. 25-29, 2001.
Dammann et al., "Beamforming in Combination with Space-Time Diversity for Broadband OFDM Systems," *IEEE International Conference on Communications.*, Apr. 28-May 2, 2002.
Dammann et al., "Exploring Spatial Diversity Techniques for Future Broadband Multicarrier Mobile Radio Systems," *Proceedings European Conference on Wireless Technology.*, Sep. 26-27, 2002.
Dammann et al., "On the Equivalence of Space-Time Block Coding with Multipath Propagation and/or Cyclic Delay Diversity in OFDM," *European Wireless.*, Feb. 25-28, 2002.
Davis et al., "Joint MAP Equalization and Channel Estimation for Frequency-Selective and Frequency-Flat Fast-Fading Channels," IEEE Transactions On communications, vol. 49, No. 12, pp. 2106-2114, Dec. 2001.
Diggavi et al., "Differential Space-Time Coding for Frequency-Selective Channels," Procedures of $36^{th}$ Conference on Information Sciences and Systems, pp. 1-8, Princeton University, NJ, Mar. 20-22, 2002.
Donelan and O'Farrell., "A New Method for Generating Sets of Orthogonal Sequences for a Synchronous CDMA System," *LNCS 1746. UK*, 1999.
Dong et al., "Optimal Design and Placement of Pilot Symbols for Channel Estimation," IEEE Transactions On Signal Processing, vol. 50, No. 12, pp. 3055-3069, Dec. 2002.
Duel-Hallen et al., "Long-Range Predication of Fading Channels," IEEE Signal Processing Magazine, pp. 62-75, May 2000.
ETSI, "Broadband Radio Access Networks (BRAN); HIPERLAN Type 2; Physical (PHY) layer," ETSI TS 101 475 V1.2.2, 2001, 41 pages.
ETSI., Digital Video Broadcasting (DVB); Framing structure, channel coding and modulation for digital terrestrial television, Jan. 2001.
Exhibit A-1: Giannakis/Stamoulis Paper.
Exhibit A-10: IEEE 802.16-33R2.
Exhibit A-11: IEEE 802.16-59R2.
Exhibit A-12: IEEE 802.16-D1.
Exhibit A-13: Jia '325 Patent.
Exhibit A-14: Jongren Paper.
Exhibit A-15: Kaiser Dissertation.
Exhibit A-16: Kaiser OFDM Paper.
Exhibit A-17: Kaiser.
Exhibit A-18: Rainish Paper.
Exhibit A-19: Ophir Paper.
Exhibit A-2: Giannakis/Wang Paper.
Exhibit A-20: Sampath Dissertation.

(56) References Cited

OTHER PUBLICATIONS

Exhibit A-21: Talwar Application.
Exhibit A-22: WCDMA.
Exhibit A-3: Ling Patent.
Exhibit A-4: Monsen Patent.
Exhibit A-5: Gupta Patent.
Exhibit A-6: Ketchum Patent.
Exhibit A-7: Golding Paper.
Exhibit A-8: WO 03/085875.
Exhibit A-9: Dammann Sep. 2002 Paper.
Exhibit B-1: Giannakis/Stamoulis Paper.
Exhibit B-10: IEEE 802.16-33R2.
Exhibit B-11: IEEE 802.16-59R2.
Exhibit B-12: IEEE 802.16-D1.
Exhibit B-13: Jia '325 Patent.
Exhibit B-14: Jongren Paper.
Exhibit B-15: Kaiser Dissertation.
Exhibit B-16: Kaiser OFDM Paper.
Exhibit B-17: Kaiser 2000 Paper.
Exhibit B-18: Rainish Paper.
Exhibit B-19: Ophir Patent.
Exhibit B-2: Giannakis/Wang Paper.
Exhibit B-20: Sampath Dissertation.
Exhibit B-21: Talwar Application.
Exhibit B-22: WCDMA.
Exhibit B-3: Ling Patent.
Exhibit B-4: Monsen Patent.
Exhibit B-5: Gupta Patent.
Exhibit B-6: Ketchum Patent.
Exhibit B-7: Golding Paper.
Exhibit B-8: WO 03/085875.
Exhibit B-9: Dammann Sep. 2002 Paper.
Exhibit C-1: Narasimhan '316 Patent.
Exhibit C-10: Ma '246 Patent.
Exhibit C-2: Wu Patent.
Exhibit C-3: IEEE 802.16.
Exhibit C-4: IEEE 802.16-33R2.
Exhibit C-5: IEEE 802.16-59R2.
Exhibit C-6: IEEE 802.16-D2.
Exhibit C-7: Baum.
Exhibit C-8: Giannakis Null Subcarrier Article.
Exhibit C-9: Krishnan Patent.
Exhibit D-l: Narasimhan '316 Patent.
Exhibit D-10: Ma '246 Patent.
Exhibit D-2: Wu Patent.
Exhibit D-3: IEEE 802.16.
Exhibit D-4: IEEE 802.16-33R2.
Exhibit D-5: IEEE 802.16-59R2.
Exhibit D-6: IEEE 802.16-D2.
Exhibit D-7: Baum.
Exhibit D-8: Giannakis Null Subcarrier Article.
Exhibit D-9: Krishnan Patent.
Exhibit E-l: Narasimhan '316 Patent.
Exhibit E-10: Ma '246 Patent.
Exhibit E-2: Wu Patent.
Exhibit E-3: IEEE 802.16.
Exhibit E-4: IEEE 802.16-33R2.
Exhibit E-5: IEEE 802.16-59R2.
Exhibit E-6: IEEE 802.16-D2.
Exhibit E-7: Baum.
Exhibit E-8: Giannakis Null Subcarrier Article.
Exhibit E-9: Krishnan Patent.
Falconer et al., "Frequency domain equalization for single-carrier broadband wireless systems," *IEEE Communications Magazine.*, 40(4): 58-66, Apr. 2002.
Fan et al., "Joint turbo coding and modulated coding for channel with intersymbol interference." *IEEE Transactions on Consumer Electronics.*, 46(2):390-394, May 2000.
Fechtel et al., "Optimal Parametric Feedforward Estimation of Frequency-Selective Fading Radio Channels," IEEE Transactions on Communications, vol. 42, No. 2/3/4, pp. 1639-1650, Feb./Mar./Apr. 1994.
Fernandez et al., "Pilot patterns for channel estimation in OFDM," *Electronics Letters.*, vol. 36(12), Jun. 8, 2000.
File History of U.S. Pat. No. 7,292,647, Parent of Re. 45,230, 165 pages.
File History of U.S. Pat. No. 8,588,317, 337 pages.
File History of U.S. Pat. No. 8,718,185, 265 pages.
File History of U.S. Pat. No. Re. 45,230, 475 pages.
Foschini, "Layered Space-Time Architecture for Wireless Communications in a Fading Environment When Using Multi-Element Antennas," Bell Labs Technical Journal, vol. 1, No. 2, pp. 41-59, 1996.
Fragouli et al., "Finite-Alphabet Constant-Amplitude Training Sequence for Multiple-Antenna Broadband Transmissions," Procedures of IEEE International Conference on Communications, vol. 1, pp. 6-10, NY City, Apr. 28-May 1, 2002.
Fragouli et al., "Reduced-Complexity Training Schemes for Multiple-Antenna Broadband Transmissions," Procedure of Wireless Communications and Networking Conference, vol. 1, pp. 78-83, Mar. 17-21, 2002.
Frenger et al., "Decision-Directed Coherent Detection in Multicarrier Systems on Rayleigh Fading Channels," IEEE Trans. On Vehicular Tech., vol. 48, No. 2, pp. 490-498, Mar. 1999.
Furuskar et al., "EDGE: Enhanced Data Rates for GSM and TDMA/136 Evolution," IEEE Personal Communications, vol. 6, No. 3, pp. 56-66, Jun. 1999.
Gansman et al., "Optimum and Suboptimum Frame Synchronization for Pilot-Symbol-Assisted Modulation," IEEE Transactions on Communications, vol. 45, No. 10, pp. 1327-1337, Oct. 1997.
Gaspa et al., "Space-Time Coding for UMTS. Performance Evaluation in Combination with Convolutional and Turbo Coding," *IEEE-VTS Vehicular Technology Conference Fall 2000. VTC 2000. $52^{nd}$* vol. 1, Sep. 24-28, 2000.
Gerlach and Paulraj., "Adaptive transmitting antenna methods for multipath environments," *IEEE Global Telecommunications Conference, 1994. GLOBECOM '94. Communications: The Global Bridge.*, Nov. 28-Dec. 2, 1994.
Gerlach and Paulraj., "Spectrum reuse using transmitting antenna arrays with feedback," *IEEE International Conference on Acoustics, Speech, and Signal Processing*, Apr. 19-22, 1994.
Ghogho and Swami., "Semi-blind frequency offset synchronization for OFDM," *IEEE International Conference on Acoustics, Speech, and Signal Processing (ICASSP)*, May 13-17, 2002.
Ghogho et al., "Optimized Null-Subcarrier Selection for CFO Estimation in OFDM over Frequency-Selective Fading Channels," Proc. of GLOBECOM, vol. 1, pp. 202-206, San Antonio, TX, Nov. 25-29, 2001.
Ghogho et al.,"Optimized Null-subcarrier Selection for CFO Estimation in OFDM over Frequency-selective Fading Channels," *IEEE Global Telecommunications Conference.*, Nov. 25-29, 2001.
Giannakis et al., "Basis Expansion Models and Diversity Techniques for Blind Identification and Equalization of Time-Varying Channels," Proceedings of the IEEE, vol. 86, No. 10, pp. 1969-1986, Oct. 1998.
Giannakis et al., "Load-Adaptive MUI/ISI-Resilient Generalized Multi-Carrier CDMA with Linear and DF Receivers," *European Transactions on Telecommunications*, 11(6), Oct. 2000.
Giannakis et al., "Load-Adaptive MUI/ISI-Resilient Generalized Multi-Carrier CDMA with Linear and DF Receivers," *European transactions on telecommunications.*, 11(6):527-537, May 19, 2000.
Giannakis, "Cyclostationary Signal Analysis," The Digital Signal Processing Handbook, V.K. Madisetti and D. Williams, Eds. Boca Raton, FL: CRC, Chapter 17, 1998.
Giannakis, "Filterbanks for Blind Channel Identification and Equalization," IEEE Signal Processing Letters, vol. 4, No. 6, pp. 184-187, Jun. 1997.
Ginis and Cioffi., "A Multi-user Precoding Scheme achieving Crosstalk Cancellation with Application to DSL Systems," *Conference Record of the Thirty-Fourth Asilomar Conference on Signals, Systems and Computers.*, vol. 2, Oct. 29-Nov. 1, 2000.

(56) References Cited

OTHER PUBLICATIONS

Giraud et al., "Algebraic Tools To Build Modulation Schemes for Fading Channels," IEEE Transactions on Information Theory, vol. 43, No. 3, pp. 938-952, May 1997.
Goeckel, "Coded Modulation With Non-Standard Signal Sets for Wireless OFDM Systems," in Procedures International Conference Communications, Vancouver, BC, Canada, pp. 791-795, Jun. 1999.
Goeckel., "Coded Modulation with Non-Standard Signal Sets for Wireless OFDM," *IEEE International Conference on Systems; Communications*, Jun. 6-10, 1999.
Golding and Jones, "Cochannel Interference In Wireless LANS and Fuzzy Clustering," *The 8th IEEE International Symposium on Personal, Indoor and Mobile Radio Communications*, Sep. 1-4, 1997.
Gong et al., "Space-Frequency-Time Coded OFDM for Broadband Wireless Communications," Global Telecommunications Conference, GLOBECOM '01, IEEE, Vo. 1, pp. 519-523, Nov. 25-29, 2001.
Gray, "On the Asymptotic Eigenvalue Distribution of Toeplitz Matrices," IEEE Transactions On Information Theory, vol. IT-18, No. 6, pp. 725-730, Nov. 1972.
Guey et al., "Signal Design for Transmitter Diversity Wireless Communication Systems Over Rayleigh Fading Channels," IEEE Transactions on Communications, vol. 47, No. 4, pp. 527-537, Apr. 1999.
Guey et al., "Signal design for transmitter diversity wireless communication systems over Rayleigh fading channels," *IEEE Transactions on Communications*, vol. 47(4), Apr. 1999.
Guillaud et al., "Full-rate full-diversity space frequency coding for MIMO OFDM systems," *Proc. 3rd IEEE Benelux Signal Processing Symposium (SPS-2002).(Leuven, Belgium).*, S02-1-S02-4, Mar. 21-22, 2002, 4 pages.
Guillaud et al., "Multi-Stream Coding for MIMO OFDM Systems With Space-Time-Frequency Spreading," Wireless Personal Multimedia Communications, the 5th International Symposium, vol. 1, pp. 120-124, Oct. 27-30, 2002.
Hadad., OFDMA PHY proposal for the 802.16.3 PHY layer; Doc. No. IEEE 802.16.3p-01/33, Mar. 13, 2001.
Hamaguchi and Hanzo., "Time Frequency Spread OFDM/FHMA," *The 57th IEEE Semiannual Vehicular Technology Conference.*, vol. 2, Apr. 22-25, 2003.
Hara et al., "A simple null-steering adaptive array antenna in OFDM-based WPAN/WLAN," *The 57th IEEE Semiannual Vehicular Technology Conference.*, vol. 1, Apr. 22-25, 2003.
Hassibi et al., "How Much Training Is Needed in Multiple-Antenna Wireless Links?" IEEE Transactions On Information Theory, vol. 49, No. 4, pp. 951-963, Apr. 2003.
Heath, Jr. et al., "Exploiting Input Cyclostationarity for Blind Channel Identification in OFDM Systems," IEEE Transactions on Signal Processing, vol. 47, No. 3, pp. 848-856, Mar. 1999.
Hill., Chapter 1 and 4, "Elementary Linear Algebra with Applications," *Harcourt Brace Jovanovich.*, $2^{nd}$ (ed), 1991, 22 pages.
Hochwald et al., "Achieving Near-Capacity on a Multiple-Antenna Channel," IEEE Transactions on Communication, vol. 51, No. 3, pp. 389-399, Mar. 2003.
Hoeher et al., "Channel Estimation with Superimposed Pilot Sequence," in Procedure GLOBECOM Conference, Brazil, pp. 1-5, Dec. 1999.
Hoeher et al., "Two-Dimensional Pilot-Symbol-Aided Channel Estimation by Wiener Filtering," Procedures of International Conference on Acoustics, Speech and Signal Processing, Munich, Germany, vol. 3, pp. 1845-1848, Apr. 1997.
Holden et al., "A Spread-Spectrum Based Synchronization Technique for Digital Broadcast Systems," IEEE Transactions on Broadcasting, vol. 36, No. 3, pp. 185-194, Sep. 1990.
Horn and Johnson., Matrix Analysis, Cambridge University Press, 1985.
IEEE 802.16 Broadband Wireless Access Working Group: Editorial rewrite of P802.16a/D4, Jun. 22, 2002.
IEEE 802.16 Broadband Wireless Access Working Group: OFDM mode for the IEEE 802.16a PHY draft standard, May 17, 2001.
IEEE 802.16 Broadband Wireless Access Working Group: OFDM proposal for the IEEE 802.16a PHY draft standard, Mar. 9, 2001.
IEEE 802.16 Broadband Wireless Access Working Group: PHY proposal for IEEE 802.16.3, Oct. 30, 2000.
IEEE 802.16a: Part 16: Air Interface for Fixed Broadband Wireless Access Systems—Amendment 2: Medium Access Control Modifications and Additional Physical Layer Specifications for 2-11 GHz IEEE Std 802.16a™-2003, Apr. 1, 2003.
IEEE Std 802.11a-1999, "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications High-speed Physical Layer in the 5 GHz Band," 1999, 91 pages.
IEEE Std 802.11g-2003, "IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band," 2003, 78 pages.
Jongren et al., "Combining Transmit Beamforming and Orthogonal Space-Time Block Codes by Utilizing Side Information," *Proceedings of the 2000 IEEE Sensor Array and Multichannel Signal Processing Workshop.*, Mar. 16-17, 2000.
Kailath, "Measurements on Time-Variant Communication Channels," IEEE Transactions On Information Theory, vol. IT-8, pp. S229-S236, Sep. 1962.
Kaiser and Fazel., "A Flexible Spread-Spectrum Multi-Carrier Multiple-Access System for Multi-Media Applications," The $8^{th}$ IEEE International Symposium on Personal, Indoor and Mobile Radio Communications. Waves of the Year 2000. PIMRC '97, vol. 1 , Sep. 1-4, 1997.
Kaiser and Hagenauer., "Multi-Carrier CDMA with Iterative Decoding and Soft-Interference Cancellation," IEEE Global Telecommunications Conference, GLOBECOM '97, vol. 1, Nov. 3-8, 1997.
Kaiser and Robertson., "OFDM: A Key Component for Terrestrial Broadcasting and Cellular Mobile Radio," *International Conference on Telecommunications.*, (ICT'96), Istanbul, Turkey, Apr. 1996.
Kaiser et al., "A Flexible Spread-Spectrum Multi-Carrier Multiple-Access System for Multi-Media Applications," in Procedures of $8^{th}$ IEEE International Symposium PIMRC, vol. 1, 1997, pp. 100-104.
Kaiser., "Multi-Canier CDMA Mobile Radio Systems—Analysis and Optimization of Detection, Decoding, and Channel Estimation," *PhD Thesis Geiman Aerospace Center (DLR).*, Jan. 1988.
Kaiser., "OFDM with Code Division Multiplexing and Transmit Antenna Diversity for Mobile Communications," *IEEE International Symposium PIMRC.*, 2:804-808, Feb. 2000.
Kaiser., "OFDM with Code Division Multiplexing and Transmit Antenna Diversity for Mobile Communications," *The 11th IEEE International Symposium on Personal, Indoor and Mobile Radio Communications*, Sep. 18-21, 2000.
Kaiser., "Performance of Multi-Carrier CDM and COFDM in Fading Channels," *IEEE International Symposium PIMRC.*, 847-851, 1999.
Kaiser., "Spatial Transmit Diversity Techniques for Broadband OFDM Systems," *IEEE Global Telecommunications Conference, 2000.* vol. 3 , Nov. 27-Dec. 1, 2000.
Kaleh, "Channel Equalization for Block Transmission Systems," IEEE Journal on Selected Areas In Communications, vol. 13, No. 1, pp. 110-121, Jan. 1995.
Keller et al., "Adaptive Multicarrier Modulation: A Convenient Framework for Time-Frequency Processing in Wireless Communications," IEEE Proceedings of the IEEE, vol. 88, No. 5, pp. 611-640, May 2000.
Koffman et al., "Broadband Wireless Access Solutions Based on OFDM Access in IEEE 802.16," IEEE Communications Magazine, vol. 40, No. 4, pp. 96-103, Apr. 2002.
Kozek, "On the Transfer Function Calculus for Underspread LTV Channels," IEEE Transactions On Signal Processing, vol. 45, No. 1, pp. 219-223, Jan. 1997.
Kuo et al., "Frequency Offset Compensation of Pilot Symbol Assisted Modulation in Frequency Flat Fading," IEEE Transactions on Communications, vol. 45, No. 11, pp. 1412-1416, Nov. 1997.

(56) References Cited

OTHER PUBLICATIONS

LAN MAN Standards Committee of the IEEE Computer Society and the IEEE Microwave Theory and Techniques Society: IEEE Draft Standard for Local and Metropolitan Area Networks—Part 16: Air Interface for Fixed Broadband Wireless Access Systems—Medium Access Control Modifications and Additional Physical Layer Specifications for 2-11 GHz, Feb. 7, 2002.
LAN MAN Standards Committee of the IEEE Computer Society and the IEEE Microwave Theory and Techniques Society: IEEE Draft Standard for Local and Metropolitan Area Networks—Part 16: Air Interface for Fixed Broadband Wireless Access Systems—Medium Access Control Modifications and Additional Physical Layer Specifications for 2-11 GHz, Jul. 20, 2002.
LAN MAN Standards Committee of the IEEE Computer Society and the IEEE Microwave Theory and Techniques Society: IEEE Draft Standard for Local and Metropolitan Area Networks—Part 16: Air Interface for Fixed Broadband Wireless Access Systems—Medium Access Control Modifications and Additional Physical Layer Specifications for 2-11 GHz, Nov. 17, 2002.
LAN MAN Standards Committee of the IEEE Computer Society and the IEEE Microwave Theory and Techniques Society: IEEE Draft Standard for Local and Metropolitan Area Networks—Part 16: Air Interface for Fixed Broadband Wireless Access Systems—Medium Access Control Modifications and Additional Physical Layer Specifications for 2-11 GHz, Nov. 30, 2001.
LAN MAN Standards Committee of the IEEE Computer Society and the IEEE Microwave Theory and Techniques Society: Part 16: Air Interface for Fixed Broadband Wireless Access Systems—Medium Access Control Modifications and Additional Physical Layer Specifications for 2-11 GHz, May 27, 2002.
LAN MAN Standards Committee of the IEEE Computer Society and the IEEE Microwave Theory and Techniques Society: Part 16: Air Interface for Fixed Broadband Wireless Access Systems—Medium Access Control Modifications and Additional Physical Layer Specifications for 2-11 GHz, Jul. 30, 2002.
LAN MAN Standards Committee of the IEEE Computer Society and the IEEE Microwave Theory and Techniques Society: Part 16: Air Interface for Fixed Broadband Wireless Access Systems—Medium Access Control Modifications and Additional Physical Layer Specifications for 2-11 GHz, Oct. 27, 2002.
LAN MAN Standards Committee of the IEEE Computer Society and the IEEE Microwave Theory and Techniques Society: Part 16: Air Interface for Fixed Broadband Wireless Access Systems—Medium Access Control Modifications and Additional Physical Layer Specifications for 2-11 GHz, Nov. 17, 2002.
Lapidoth et al., "Fading Channels: How Perfect Need "Perfect Side Information" be?," in Procedures IEEE Information Theory Communications Workshop, pp. 36-38, Jun. 1999.
Larson et al., Joint Symbol Timing and Channel Estimation for OFDM Based WLANs, *IEEE Communications Letters*., 5(8), Aug. 2001.
Larsson et al., "Preamble design for multiple-antenna OFDM-based WLANs with null subcarriers," *IEEE Signal Processing Letters*., 8(11):285-288, Nov. 2001.
Lawrey., "Adaptive Techniques for Multiuser OFDM," *Thesis, James Cook University*, Dec. 2001.
Lee and Williams., "A Space-Frequency Transmitter Diversity Technique for OFDM Systems," *IEEE Global Telecommunications Conference*, vol. 3, Nov. 27-Dec. 1, 2000.
Li et al., "Bit-Interleaved Coded Modulation with Iterative Decoding," *IEEE Communications Letters*., vol. 1(6), Nov. 1997.
Li et al., "Transmitter Diversity for OFDM Systems and Its Impact on High-Rate Data Wireless Networks," IEEE Journal on Selected Areas In Communications, vol. 17, No. 7, pp. 1233-1243, Jul. 1999.
Li, "Simplified Channel Estimation for OFDM Systems With Multiple Transmit Antennas," IEEE Transactions On Wireless Communications, vol. 1, No. 1, pp. 67-75, Jan. 2002.
Li, Nambirajan Seshadri, and Sirikiat Ariyavisitakul, "Channel Estimation for OFDM Systems with Transmitter Diversity in Mobile Wireless Channels," IEEE Journal on Selected Areas in Communications, vol. 17, No. 3, pp. 461-471, Mar. 1999.
Lihua et al., "A practical space-frequency block coded OFDM scheme for fast fading broadband channels," *The 13th IEEE International Symposium on Personal, Indoor and Mobile Radio Communications*., vol. 1, Sep. 15-18, 2002.
Lin et al., "Block Based DMT Systems With Reduced Redundancy," Procedures of International Conference on ASSP, Salt Lake City, UT, pp. 2357-2360, May 2001.
Lindskog et al, "A Transmit Diversity Scheme for Channels With Intersymbol Interference," Procedures of ICC, vol. 1, pp. 307-311, Jun. 2000.
Liu and Tureli., "A High-Efficiency Carrier Estimator for OFDM Communications", *IEEE Communications Letters*, vol. 2(4), Apr. 1998.
Liu and Tureli., "Blind Carrier Synchronization and Channel Identification for OFDM Communications," *Proceedings of the 1998 IEEE International Conference on Acoustics, Speech and Signal Processing*., vol. 6, May 12-15, 1998.
Liu et al., "A High-Efficiency Carrier Estimator For OFDM Communications," IEEE Communications Letters, vol. 2, No. 4, pp. 104-106, Apr. 1998.
Liu et al., "Linear Constellation Precoding for OFDM with Maximum Multipath Diversity and Coding Gains," IEEE Transactions On Communications, vol. 51, No. 3, pp. 416-427, Mar. 2003.
Liu et al., "Space-Time Block-Coded Multiple Access Through Frequency-Selective Fading Channels," IEEE Transactions on Communications, vol. 49, No. 6, pp. 1033-1044, Jun. 2001.
Liu et al., "Space-Time Codes Performance Criteria and Design for Frequency Selective Fading Channels," International Conference on Communications (ICC) 2001, 5 pages.
Liu et al., "Space-Time Coding With Transmit Antennas for Multiple Access Regardless of Frequency-Selective Multipath," Procedures of Sensor Array and Multichannel Signal Processing Workshop, pp. 178-182, Mar. 2000.
Liu et al., Space-Time-Frequency Coded OFDM Over Frequency-Selective Fading Channels, IEEE Transactions on Signal Processing, vol. 50, No. 10, pp. 2465-2476, Oct. 2002.
Liu et al., "Transmit-Antennae Space-Time Block Coding for Generalized OFDM in the Presence of Unknown Multipath," IEEE Journal on Selected Areas In Communications, vol. 19, No. 7, pp. 1352-1364, Jul. 2001.
Liu, et al., "Space-Time Coding for Broadband Wireless Communications," Wireless Communication Mobile Computers, vol. 1, No. 1, pp. 33-53, Jan.-Mar. 2001.
Liu., "Space-Time Coding for Broadband Wireless Communication Systems. Diss," *University of Minnesota*., Dec. 2001.
Lu et al., "Space-Time Code Design in OFDM Systems," in Procedures Global Telecommunications Conference, vol. 2, San Francisco, CA, pp. 1000-1004, Nov. 27-Dec. 1, 2000.
Luise et al., "Low-Complexity Blind Carrier Frequency Recovery for OFDM Signals Over Frequency-Selective Radio Channels," *IEEE Transactions on Communications*., vol. 50, No. 7, Jul. 2002.
Ma et al., "Consistent Blind Synchronization of OFDM Transmissions using Null Subcarriers with Distinct Spacings," Proc. of 3rd IEEE Workshop on Signal Processing Advances in Wireless Communications, pp. 146-149, Taoyuan, Taiwan, R.O.C, Mar. 20-23, 2001.
Ma et al., "Consistent Blind Synchronization of OFDM Transmissions Using Null Sub-Carriers with Distinct Spacings," *Third IEEE Signal Processing Workshop on Signal Processing Advances in Wireless Communications*., Mar. 20-23, 2001.
Ma et al., "Full-rate full-diversity complex-field space-time codes for frequency-or time-selective fading channels," *Conference Record of the Thirty-Sixth Asilomar Conference Signals, Systems and Computers*., vol. 2., Nov. 3-6, 2002.
Ma et al., "Maximum Diversity Transmissions Over Doubly Selective Wireless Channels," IEEE Transactions On Information Theory, vol. 49, No. 7, pp. 1832-1840, Jul. 2003.
Ma et al., "Non-Data-Aided Carrier Offset Estimators for OFDM With Null Subcarriers: Identifiability, Algorithms, and Performance," IEEE Journal On Selected Areas In Communications, vol. 19, No. 12, pp. 2504-2515, Dec. 2001.

(56) References Cited

OTHER PUBLICATIONS

Ma et al., "Non-Data-Aided Carrier Offset Estimators for OFDM With Null Subcarriers: Identifiability, Algorithms, and Performance," *IEEE Journal on Selected Areas in Communications*, vol. 19(12), Dec. 2001.
Ma et al., "Non-data-aided frequency-offset and channel estimation in OFDM: and related block transmissions," *IEEE International Conference on Communications.*, vol. 6, Jun. 11-14, 2001.
Ma et al., "Optimal Training for Block Transmissions Over Doubly Selective Wireless Fading Channels," IEEE Transactions on Signal Processing, vol. 51, No. 5, pp. 1351-1366, May 2003.
Ma et al., "Optimal training for MIMO frequency-selective fading channels," Conference Record of the Thirty-Sixth Asilomar Conference on Signals, Systems and Computers, Pacific Grove, CA Nov. 3-6, 2002, vol. 2, pp. 1107-1111.
Ma et al., "Optimal Training for MIMO Frequency-Selective Fading Channels," IEEE Transactions on Wireless Communications, vol. 4, No. 2, Mar. 2005, 14 pages.
Manton et al., "Affine Precoders for Reliable Communications," in Procedures International Conference ASSP, vol. 5, Istanbul, Turkey, pp. 2749-2752, Jun. 2000.
Manton., "Dissecting OFDM: The Independent Roles of the Cyclic Prefix and the IDFT Operation," *IEEE Communications Letters.*, vol. 5(12), Dec. 2001.
Martone, "Wavelet-Based Separating Kernels for Sequence Estimation with Unknown Rapidly Time-Varying Channels," IEEE Communications Letter, vol. 3, No. 3, pp. 78-80, Mar. 1999.
Marzetta and Hochwald, "Capacity of a Mobile Multiple-Antenna Communication Link in Rayleigh Flat Fading," IEEE Transactions on Information Theory, vol. 45, pp. 1-38, Jan. 1999.
Medard, "The Effect Upon Channel Capacity in Wireless Communications of Perfect and Imperfect Knowledge of the Channel," IEEE Transactions on Information Theory, vol. 46, No. 3, pp. 933-946, May 2000.
Merouane et al., "Asymptotic performance analysis for redundant block precoded OFDM systems with MMSE equalization," *Proceedings of the 11th IEEE Signal Processing Workshop on Statistical Signal Processing.*, Aug. 6-8, 2001, 4 pages.
Merouane et al., "MMSE Analysis of Certain Large Isometric Random Precoded Systems," *ITW2001, Cairns, Australia.*, Sep. 2-7, 2001, 3 pages.
Mignone et al., "CD3-OFDM: A Novel Demodulation Scheme for Fixed and Mobile Receivers," IEEE Transactions on Communications, vol. 44, No. 9, pp. 1144-1151, Sep. 1996.
Mody et al., "Receiver implementation for a MIMO OFDM system," *IEEE Global Telecommunications Conference.*, vol. 1., Dec. 2002.
Moose, "A Technique for Orthogonal Frequency Division Multiplexing Frequency Offset Correction," IEEE Transactions On Communications, vol. 42, No. 10, pp. 2908-1314, Oct. 1994.
Moose., "A Technique for Orthogonal Frequency Division Multiplexing Frequency Offset Correction," *IEEE Transactions on Communications.*, vol. 42(10), Oct. 1994.
Morelli et al., "Carrier-Frequency Estimation for Transmissions Over Selective Channels," IEEE Transactions On Communications, vol. 48, No. 9, pp. 1580-1589, Sep. 2000.
Muquet et al., "A Subspace Based Blind and Semi-Blind Channel Identification Method for OFDM Systems," Proc. of IEEE-SP Workshop on Signal Proc. Advances in Wireless Comm., Annapolis, MD, pp. 170-173, May 9-12, 1999.
Muquet et al., "OFDM with Trailing Zeros Versus OFDM with Cyclic Prefix: Links, Comparisons and Application to the Hiperlan/2 Systems," Proc. of Intl. Conf. On Com., New Orleans, pp. 1049-1053, Jun. 2000.
Muquet et al., "Reduced Complexity Equalizers For Zero-Padded OFDM Transmissions," Procedures of International Conference on ASSP, vol. 5, pp. 2973-2976, Jun. 2000.

Nagaraj and Huang., "Downlink Transmit Beamforming with Selective Feedback," *Conference Record of the Thirty-Fourth Asilomar Conference on Signals, Systems and Computers.*, Oct. 29-Nov. 1, 2000.
Naguib et al., "Increasing Data Rate Over Wireless Channels," IEEE Signal Processing Magazine, vol. 17, pp. 76-92, May 2000.
Nee and Prasad, "OFDM Wireless Multimedia Communications," *Artech House.*, 59 pages, 2000.
Negi et al., "Pilot Tone Selection for Channel Estimation in a Mobile OFDM System," IEEE Transactions On Consumer Electronics, vol. 44, No. 3, pp. 1122-1128, Aug. 1998.
Newton's Telecom Dictionary, *CMP Books.*, Sixteenth and a Half Edition, Jul. 2000, 3 pages.
Nogami and Nagashima., "A Frequency and Timing Period Acquisition Technique for OFDM Systems," *IEICE Transactions on Communications.*, vol. E79-B, No. 8, Aug. 1996.
Oh et al., "Hopping Pilots for Estimation of Frequency-Offset and Multi-Antenna Channels in MIMO OFDM," *IEEE Global Telecommunications Conference*, Dec. 1-5, 2003.
Ohno et al., "Average-Rate Optimal PSAM Transmissions Over Time-Selective Fading Channels," IEEE Transactions On Wireless Communications, pp. 374-378, Oct. 2002.
Ohno et al., "Capacity Maximizing MMSE-Optimal Pilots for Wireless OFDM Over Frequency-Selective Block Rayleigh-Fading Channels," IEEE Transactions On Information Theory, pp. 2138-2145, vol. 50, No. 9, Sep. 2004.
Ohno et al., "Optimal Training and Redundant Precoding For Block Transmissions With Application to Wireless OFDM," IEEE Transactions on Communications, vol. 50, No. 12, pp. 2113-2123, Dec. 2002.
Petition for Inter Partes Review of U.S. Pat. No. 7,251,768, Dated Mar. 29, 2017, 81 pages.
Petition for Inter Partes Review of U.S. Pat. No. 8,588,317, Dated Mar. 30, 2017, 56 pages.
Petition for Inter Partes Review of U.S. Pat. No. Re. 45,230, Dated Mar. 30, 2017, 92 pages.
Petition for Inter Psrtes Review of U.S. Pat. No. 8,718,185, Dated Mar. 28, 2017, 80 pages.
Petition for Inter Psrtes Review of U.S. Pat. No. 8,774,309, Dated Mar. 28, 2017, 81 pages.
Poor, "Probability of Error in MMSE Multiuser Detection," IEEE Transaction on Information Theory, vol. 43, No. 3, pp. 858-871, May 1997.
Proakis., Chapter 14 "Digital Communications," *McGraw-Hill.*, $3^{rd}$ (ed), 758-839, 1995, 92 pages.
Prosecution History of U.S. Pat. No. 7,251,768, 195 pages.
Prosecution History of U.S. Pat. No. 8,774,309, 304 pages.
U.S. Appl. No. 60/374,933, 80 pages.
U.S. Appl. No. 60/449,729, 26 pages.
Rainish., "Diversity Transform for Fading Channels," *IEEE Transactions on Communications*, vol. 44(12), Dec. 1996.
Raleigh et al., "Spatio-Temporal Coding for Wireless Communication; *IEEE Transactions on Communications.*," vol. 46(3), Mar. 1998.
Regents Opposition to Ericsson's Motion to Intervene, Filed Jan. 28, 2016, 14 pages.
Ruiz et al., "Discrete Multiple Tone Modulation with Coset Coding for the Spectrally Shaped Channel," IEEE Transactions on Communications, vol. 4, No. 6, pp. 1012-1029, Jun. 1992.
Sampath and Paulrah., "Linear Precoding For Space-Time Coded Systems With Known Fading Correlations," *IEEE Communications Letters.*, vol. 6(6), Jun. 2002.
Sampath., "Linear Precoding and Decoding for Multiple Input Multiple Output (MIMO) Wireless Channels," *PhD Thesis Stanford University.*, Apr. 2001.
Sandell et al., "A Comparative Study of Pilot-Based Channel Estimators for Wireless OFDM," pp. 5-34, Sep. 1996.
Sari et al., "Transmission Techniques for Digital Terrestrial TV Broadcasting," IEEE Communications Magazine, vol. 33, pp. 100-103, Feb. 1995.
Saulnier et al, "Performance of an OFDM Spread Spectrum Communications system Using Lapped Transforms," in Proc. MILCOM Conf., vol. 2, 1997, pp. 608-612.

(56) References Cited

OTHER PUBLICATIONS

Saulnier et al., "Performance of a Spread Spectrum OFDM System in a Dispersive Fading Channel with Interference," in Proc. MILCOM Conf., vol. 2, 1998, pp. 679-683.
Sayeed et al., "Joint Multipath-Doppler Diversity in Mobile Wireless Communications," IEEE Transactions On Communications, vol. 47, No. 1, pp. 123-132, Jan. 1999.
Scaglione et al., "Minimum Redundancy Filterbank Precoders for Blind Channel Identification Irrespective of Channel Nulls," Proc. of IEEE Wireless Comm. and Networking Conference (WCNC'99), pp. 785-789, New Orleans, LA, Sep. 21-24, 1999.
Scaglione et al., "Filterbank Transceivers Optimizing Information Rate in block Transmissions Over Dispersive Channels," IEEE Transactions on Information Theory, vol. 45, No. 3, pp. 1019-1032, Apr. 1999.
Scaglione et al., "Optimal Designs for Space-Time Linear Precoders and Decoders," *IEEE Transactions on Signal Processing*,. vol. 50(5), May 2002.
Scaglione et al., "Redundant Filterbank Precoders and Equalizers Part I: Unification and Optimal Designs," IEEE Transactions on Signal Processing, vol. 47, No. 7, pp. 1988-2022, Jul. 1999.
Scaglione et al., "Redundant Filterbank Precoders and Equalizers Part II: Blind Channel Estimation, Synchronization, and Direct Equalization," IEEE Transactions on Signal Processing, vol. 47, No. 7, pp. 2007-2022, Jul. 1999.
Scaglione et al., "Redundant filterbank precoders and equalizers. I. Unification and optimal designs," *IEEE Transactions on Signal Processing.*, 47(7):1988-2006, Jul. 1999.
Schramm et al., "Pilot Symbol Assisted BPSK on Rayleigh Fading Channels with Diversity: Performance Analysis and Parameter Optimization," IEEE Transactions on Communications, vol. 46, No. 12, pp. 1560-1563, Dec. 1998.
Schramm, "Analysis and Optimization of Pilot-Channel-Assisted BPSK for DS-CDMA Systems," IEEE Transactions Communications, vol. 46, No. 9, pp. 1122-1124, Sep. 1998.
Schuhlein., Transmit diversity methods for OFDM; Universitat Ulm, Apr. 2002.
Siew et al., "A Channel Estimation Method for MIMO-OFDM Systems," *Center for Communications Research.*, Sep. 2002, 4 pages.
Sklar Library of Congress Info, Retrieved on Jun. 1, 2016, Retrieved from https://catalog.loc.gov/vwebv/holdingsInfo?searchId=5977 &recCount=, 1 page.
Sklar, Chapter 3, 5, 6, and7,"Digital Communications: Fundamentals and Applications," Prentice Hall, 1988, 172 pages.
Specification for U.S. Publication 20020159422, 52 pages.
Specification for U.S. Publication No. 20020051498, 23 pages.
Stamoulis et al., "Block FIR Decision-Feedback Equalizers for Filterbank Precoded Transmissions with Blind Channel Estimation Capabilities," IEEE Transactions on Communications, vol. 49, No. 1, pp. 69-83, Jan. 2001.
Stamoulis et al., "Space-time block-coded OFDMA with linear precoding for multirate services," *IEEE Transactions on Signal Processing.*, 50(1):119-129, Jan. 2002.
Strang., "Linear Algebra and its Applications," *Harcourt, Brace, Jovanovich.*, 3$^{rd}$ ed., 1988, 33 pages.
Sun et al., "Estimation of Continuous Flat Fading MIMO Channel," IEEE Transactions On Wireless Communications, vol. 1, No. 4, pp. 549-553, Oct. 2002.
Takaoka and Adachi., "Adaptive prediction iterative channel estimation for OFDM signal reception in a frequency selective fading channel," *The 57th IEEE Semiannual Vehicular Technology Conference.*, vol. 3 Apr. 22-25, 2003.
Tarokh et al., "Space-Time Block Codes from Orthogonal Designs," IEEE Transactions on Information Theory, vol. 45, No. 5, pp. 1456-1467, Jul. 1999.
Tarokh et al., "Space-Time Block Coding for Wireless Communications: Performance Results," *IEEE Journal on Selected Areas in Communications*, vol. 17(3), Mar. 1999.
Tarokh et al., "Space-Time Codes for High Data Rate Wireless Communication: Performance Criterion and Code Construction," IEEE Transactions on Information Theory, vol. 44, No. 2, pp. 744-765, Mar. 1998.
Telatar, "Capacity of Multiple-Antenna Gaussian Channels," European Transactions Telecommunications, vol. 10, pp. 1-28, Nov.-Dec. 1998.
Tepedelenlioglu et al., "Transmitter Redundancy for Blind Estimation and Equalization of Time-and Frequency-Selective Channels," IEEE Transactions On Signal Processing, vol. 48, No. 7, pp. 2029-2043, Jul. 2000.
Tirkkonen and Hottinen., "Tradeoffs Between Rate, Puncturing and Orthogonality in Space-Time Block Codes," *IEEE International Conference on Communications*, vol. 4, Jun. 11-14, 2001.
Transcript Hearing re Motion to Intervene, Filed Mar. 17, 2016, 42 pages.
Tsatsanis et al., "Equalization of Rapidly Fading Channels: Self-Recovering Methods," IEEE Transactions on Communications, vol. 44, No. 5, pp. 619-630, May 1996.
Tsatsanis et al., "Modelling and Equalization of Rapidly Fading Channels," International Journal of Adaptive Control and Signal Processing, vol. 10, pp. 159-176, May 1996.
Tsatsanis et al., "Pilot Symbol Assisted Modulation in Frequency Selective Fading Wireless Channels," IEEE Transactions On Signal Processing, vol. 48, No. 8, pp. 2353-2365, Aug. 2000.
Tufvesson et al. "Pilot Assisted Channel Estimation for OFDM in Mobile Cellular Systems," Proc. of the Vehicular Technology Conf., Phoenix, USA, vol. 3, pp. 1639-1643, May 1997.
Tufvesson et al., "OFDM Time and Frequency Synchronization by Spread Spectrum Pilot Technique," in Procedures 8$^{th}$ Communication Theory Mini-Conference, Vancouver, BC, Canada, pp. 1-5, Jun. 1999.
Tufvesson, Channel Related Optimization of Wireless Communication Systems, Thesis, Lund University, Feb. 1998.
Tufvesson., "Design of Wireless Communication Systems—Issues on Synchronization, Channel Estimation and Multi-Carrier Systems," *Thesis, Lund University.*, Aug. 2000.
Tugnait et al., "Second-Order Statistics-Based Blind Equalization of IIR Single-Input Multiple-Output Channels with Common Zeros," IEEE Transactions On Signal Processing, vol. 47, No. 1, pp. 147-157, Jan. 1999.
Tujkovic et al., "Space-frequency turbo coded OFDM for future high data rate wideband radio systems," *Vehicular Technology Conference, 2001 IEEE VTS 54th*. vol. 4., Oct. 7-11, 2001.
Tujkovic et al., "Space-frequency-time turbo coded modulation," *Communications Letters, IEEE.*, 5(12):480-482, Dec. 2001.
Tung et al., "Channel Estimation and Adaptive Power Allocation for Performance and Capacity Improvement of Multiple-Antenna OFDM Systems," Third IEEE Signal Processing Workshop on Signal Processing Advances in Wireless Communications, Taoyuan, Taiwan, pp. 82-85, Mar. 20-23, 2001.
Tureli et al., "OFDM Blind Carrier Offset Estimation: ESPRIT," IEEE Transactions On Communications, vol. 48, No. 9, pp. 1459-1461, Sep. 2000.
University of Minnesota Opposition to Ericsson's Motion to Intervene, Filed Jan. 28, 2016, 14 pages.
US Copyright Office for Skylar, Retrieved on Jun. 1, 2016, Retrieved from http://cocatalog.loc.gov/cgi-bin/Pwebrecon.cgi?v1=2&ti=1,2 &Search_A, 1 page.
US Copyright Office for Strang, Retrieved on Mar. 16, 2017, Retrieved from http://cocatalog.loc.gov/cgi-bin/Pwebrecon.cgi?v1= 119&ti=101,119&Se, 1 page.
US Copyright Office for van Nee, Retrieved on Mar. 16, 2017, Retrieved from http://cocatalog.loc.gov/cgi-bin/Pwebrecon.cgi? Search_Arg=OFDM+wir, 1 page.
US LOC Record for Sklar, Retrieved on Jun. 1, 2016, Retrieved from https://catalog.loc.gov/vwebv/holdingsInfo?searchId=5977 &recCount=, 1 page.
US LOC Record for Strang, Retrieved on Mar. 16, 2017, Retrieved from https://catalog.loc.gov/vwebv/holdingsInfo?searchId=6503 &recCount=, 2 pages.

(56) References Cited

OTHER PUBLICATIONS

US LOC Record for van Nee, Retrieved on Mar. 16, 2017, Retrieved from https://catalog.loc.gov/vwebv/holdingsInfo?searchId=6233&recCount=, 2 pages.
Van de Beek et al., "On Channel Estimation in OFDM Systems," Proc. of the Vehicular Technology Conf., Chicago, USA, vol. 2, pp. 815-819, Jul. 1995.
Van de Beek., "Synchronization and Channel Estimation in OFDM Systems," *Thesis, Lulea University of Technology*, Sep. 1998.
Van Nee and Prasad., "OFDM for Wireless Multimedia Communications," *Artech House*, 2000.
Van Nee et al., "New High-Rate Wireless LAN Standards," IEEE Communications Magazine, vol. 37, No. 12, pp. 82-88, Dec. 1999.
Van Zelst., "Per-Antenna-Coded Schemes for MIMO OFDM," *IEEE International Conference on Communications*., vol. 4, May 11-15, 2003.
Vikalo et al., "Optimal Training for Frequency-Selective Fading Channels," Procedures of International Conference on ASSP, Salt Lake City, Utah, vol. 4, pp. 2105-2108, May 7-11, 2001.
Viterbo et al., "A Universal Lattice Code Decoder for Fading Channels," IEEE Transactions on Information Theory, vol. 45, No. 5, pp. 1639-1642, Jul. 1999.
Vook et al., "Transmit Diversity Schemes for Broadband Mobile Communication Systems," Procedures of IEEE VTC, vol. 6, pp. 2523-2529, 2000.
Wachsmann et al., "Exploiting the Data-Rate Potential of MIMO Channels: Multi-Stratum Space-Time Coding," *IEEE VTS 53rd Vehicular Technology Conference*, vol. 1, May 6-9, 2001.
Wakutsu and Serizawa., "A novel carrier frequency offset estimation scheme for OFDM systems utilizing correlation with a pilot symbol without null sub-carrier," *1999 IEEE 49th Vehicular Technology Conference*, vol. 1, May 16-20, 1999.
Wang et al., "Complex-Field Coding for OFDM Over Fading Wireless Channels," IEEE Transactions on Information Theory, vol. 49, No. 3, pp. 707-720, Mar. 2003.
Wang et al., "Iterative (Turbo) Soft Interference Cancellation and Decoding for Coded CDMA," IEEE Transactions on Communications, vol. 47, No. 7, pp. 1046-1061, Jul. 1999.
Wang et al., "Joint Coding-Precoding with Low-Complexity Turbo Decoding," IEEE Transactions on Wireless Communications, vol. 3, No. 4, pp. 832-842, May 2004, 11 pages.
Wang et al., "Linearly Precoded or Coded OFDM Against Wireless Channel Fades?," Third IEEE Signal Processing Workshop on Signal Processing Advances in Wireless Communications, Taoyuan, Taiwan, pp. 267-270, Mar. 20-23, 2001.
Wang et al., "Linearly precoded or coded OFDM against wireless channel fades?," *IEEE Third Workshop on Signal Processing Advances in Wireless Communications*., Mar. 20-23, 2001, 4 pages.
Wang et al., "Optimality of Single-Carrier Zero-Padded Block Transmissions," Procedures of Wireless Communications and Networking Conference, vol. 2, pp. 660-664, 2002.
Wang et al., "Wireless Multicarrier Communications: Where Fourier Meets Shannon," IEEE Signal Processing Magazine, vol. 17, pp. 29-48, May 2000.
Wang., "Linear precoding for wireless communications," *Dissertation University of Minnesota*., Jun. 2002.
Wei et al., "Space-Time-Frequency Block Coding Over Rayleigh Fading Channels For OFDM Systems," Proceedings of the International Conference on Communication Technology, ICCT 2003, vol. 2, pp. 1008-1012, Apr. 2003.
Wei et al., "Synchronization Requirements for Multi-user OFDM on Satellite Mobile and Two-Path Rayleigh Fading Channels," IEEE Transactions on Communications, vol. 43, No. 2/3/4, pp. 887-895, Feb.-Apr. 1995.
Wesel et al., Fundamentals of Coding for Broadcast OFDM; 1995 Conference Record of the Twenty-Ninth Asilomar Conference on Signals, Systems and Computers, vol. 1, Oct. 30-Nov. 2, 1995.
Witrisal., OFDM Air-Interface Design For Multimedia Communications, Dissertation, Technische Universität Graz Thesis, Apr. 2002.

Xia et al., "Bandwidth-and Power-Efficient Multicarrier Multiple Access," IEEE Transactions On Communications, vol. 51, No. 11, pp. 1828-1837, Nov. 2003.
Xia., "Modulated Coding for Intersymbol Interference Channels," *Signal Processing and Communications Series, Marcel Dekker, Inc.*, 2001.
Xiao., "Orthogonal Frequency Division Multiplexing Modulation and Intercarrier Interference Cancellation," *Dissertation Institute of Automation*., May 2003.
Xiaoli., "Doubly-Selective Channels: Estimation, Capacity, and Space-Time Coding," *Thesis, University of Minnesota*, May 2003.
Xilinx: IEEE802.16 WirelessMAN Solutions Presentation, 2002.
Xin et al., "High-rate space-time layered OFDM." *IEEE communications letters.*, 6(5):187-189, May 2002.
Xin et al., "Linear Unitary Precoders for Maximum Diversity Gains with Multiple Transmit and Receive Antennas," Procedure of $34^{th}$ Asilomar Conference on Signals, Systems, and Computers, pp. 1553-1557, Pacific Grove, CA, Oct. 29-Nov. 1, 2000.
Xin et al., "Linear Unitary Precoders for Maximum Diversity Gains with Multiple Transmit and Receive Antennas," *Conference Record of the Thirty-Fourth Asilomar Conference on Signals, Systems and Computers*, vol. 2, Oct. 29-Nov. 1, 2000.
Xin et al., "Space-Time Constellation-Rotating Codes Maximizing Diversity and Coding Gains," in Procedures of Global Telecommunications Conference, Nov. 2001, pp. 455-459.
Xin et al., "Space-Time Constellation-Rotating Codes Maximizing Diversity and Coding Gains," *IEEE Global Telecommunications Conference*, Nov. 25-29, 2001.
Xin et al., "Space-Time Diversity Systems Based on Linear Constellation Precoding," IEEE Transactions On Wireless Communications, vol. 2, No. 2, pp. 294-309, Mar. 2003.
Xin et al., "Space-Time Diversity Systems Based on Unitary Constellation-Rotating Precoders," in Procedures International Conference, Speech, Signal Process., Salt Lake City, UT, pp. 2429-2432, May 7-11, 2001.
Xin., "Space-Time Linear Constellation Precoded Systems," *Thesis, University of Minnesota*, May 2003.
Yee et al., "BER of Multi-Carrier CDMA in an Indoor Rician Fading Channel," Conference Record of the Twenty-Seventh Asilomar Conference on Signals, Systems and Computers, pp. 426-430, 1993.
Zetterberg., The spectrum efficiency of a base station antenna array system for spatially selective transmission, Jan. 24, 1994.
Zhang et al., "A Performance Analysis and Design of Equalization with Pilot Aided Channel Estimation," Procedures of the $47^{th}$ Vehicular Technology Conference, vol. 2, pp. 720-724, 1997.
Zhang et al., "Soft Output Demodulation on Frequency-Selective Rayleigh Fading Channels Using AR Channel Models," Procedures of Global Communications Conference, vol. 1, pp. 327-331, 1997.
Zheng et al., "Communication on the Grassmann Manifold: A Geometric Approach to the Noncoherent Multiple-Antenna Channel," IEEE Transactions On Information Theory, vol. 48, No. 2, pp. 359-383, Feb. 2002.
Zhou and Giannakis., "Space-Time Coded Transmissions with Maximum Diversity Gains over Frequency-Selective Multipath Facing Channels," *IEEE Global Telecommunications Conference.*, vol. 1, Nov. 25-29, 2001.
Zhou et al., "Frequency-Hopped Generalized MC-CDMA for Multipath and Interference Suppression," in Proc. MILCOM Conf., vol. 2, Los Angeles, CA Oct. 22-25, 2000, pp. 937-941.
Zhou et al., "Chip-interleaved block-spread code division multiple access." *IEEE Transactions on Communications.*, 50(2):235-248, Feb. 2002, 6 pages.
Zhou et al., "Finite-alphabet based channel estimation for OFDM and related multicarrier systems." *IEEE Transactions on Communications*. 49(8):1402-1414, Aug. 2001.
Zhou et al., "Long Codes for Generalized FH-OFDMA Through Unknown Multipath Channels," IEEE Transactions on Communications, vol. 49, No. 4, pp. 721-733, Feb. 2001.
Zhou et al., "Space-Time Coding With Maximum Diversity Gains Over Frequency-Selective Fading Channels," IEEE Signal Processing Letters, vol. 8, No. 10, pp. 269-272, Oct. 2001.

(56) References Cited

OTHER PUBLICATIONS

Zhou et al., "Subspace-Based (Semi-) Blind Channel Estimation for Block Precoded Space-Time OFDM," IEEE Transactions On Signal Processing, vol. 50, No. 5, pp. 1215-1228, May 2002.
Zhou., "Multiple Access over Time- and Frequency-Selective Channels," *Thesis, University of Minnesota*, Sep. 2002.
Zou et al., "COFDM: An Overview," IEEE Transactions on Broadcasting, vol. 41, No. 1, pp. 1-8, Mar. 1995.

* cited by examiner

ESTIMATING FREQUENCY-OFFSETS AND MULTI-ANTENNA CHANNELS IN MIMO OFDM SYSTEMS

This application is a continuation of U.S. application Ser. No. 15/162,978, filed May 24, 2016, which is a continuation of U.S. application Ser. No. 14/289,294, filed May 28, 2014, which is a continuation of U.S. application Ser. No. 13/783, 039, filed Mar. 1, 2013, which is a continuation of U.S. application Ser. No. 13/777,993, filed Feb. 26, 2013, which is a continuation of U.S. application Ser. No. 13/301,482, filed Nov. 21, 2011, which is a continuation of U.S. application Ser. No. 10/850,961, filed May 21, 2004, which claims the benefit of U.S. Provisional Application Ser. No. 60/472,297, filed May 21, 2003, the entire content of each being incorporated herein by reference.

STATEMENT REGARDING FEDERALLY SPONSORED RESEARCH OR DEVELOPMENT

This invention was made with Government support under CCR-0105612 awarded by the National Science Foundation and DAAD19-01-2-011 awarded by the Army Research Office. The Government has certain rights in the invention.

TECHNICAL FIELD

The invention relates to communication systems and, more particularly, carrier frequency offset estimation and channel estimation in communication systems.

BACKGROUND

Providing reliable high data rate services, e.g. real-time multimedia services, over wireless communication channels is a paramount goal in developing coding and modulation schemes. When a data rate for wireless communication systems is high in relation to bandwidth, multipath propagation may become frequency-selective and cause intersymbol interference (ISI). Multipath fading in wireless communication channels causes performance degradation and constitutes the bottleneck for increasing data rates.

Orthogonal frequency division multiplexing (OFDM) is inherently resistant to multipath fading and has been adopted by many standards because it offers high data-rates and low decoding complexity. For example, OFDM has been adopted as a standard for digital audio broadcasting (DAB) and digital video broadcasting (DVB) in Europe and high-speed digital subscriber lines (DSL) in the United States. OFDM has also been proposed for local area mobile wireless broadband standards including IEEE 802.11a, IEEE 802.11g, MMAC and HIPERLAN/2. Additionally, space-time (ST) multiplexing with multiple antenna arrays at both the transmitter and receiver are effective in mitigating fading and enhancing data rates. Therefore, multi-input multi-output (MIMO) OFDM is attractive for multi-user wireless communication systems. However, MIMO OFDM systems have increasing channel estimation complexity as the number of antennas increases due to the increased number of unknowns which must be estimated and have great sensitivity to carrier frequency offsets (CFO).

Typical single-input single-output (SISO) OFDM systems rely on blocks of training symbols or exploit the presence of null sub-carriers in order to acquire channel state information (CAI) to mitigate CFO and perform channel estimation. In the IEEE 802.11a, IEEE 802.11g, and HIPERLAN/2 standards, sparsely placed pilot symbols are present in every OFDM symbol and pilot symbols are placed in the same positions from block to block. Additionally, channel estimation is performed on a per block basis.

For channel state information (CSI) acquisition, three classes of methods are available: blind methods which estimate CSI solely from the received symbols; differential methods that bypass CSI estimation by differential encoding; and input-output methods which rely on training symbols that are known a priori to the receiver. Relative to training based schemes, differential approaches incur performance loss by design, while blind methods typically require longer data records and entail higher complexity. Although training methods can be suboptimal and are bandwidth consuming, training methods remain attractive in practice because they decouple symbol detection from channel estimation, thereby simplifying receiver complexity and relaxing the required identifiability conditions.

SUMMARY

In general, the invention is directed to techniques for carrier frequency offset (CFO) and channel estimation of orthogonal frequency division multiplexing (OFDM) transmissions over multiple-input multiple-output (MIMO) frequency-selective fading channels. In particular, techniques are described that utilize training symbols such that CFO and channel estimation are decoupled from symbol detection at the receiver. Unlike conventional systems in which training symbols are inserted within a block of space-time encoded information-bearing symbols to form a transmission block, the techniques described herein insert training symbols over two or more transmission blocks. Furthermore, training symbols may include both non-zero symbols and zero symbols and are inserted so that channel estimation and CFO estimation are performed separately. Zero symbols, referred to as null subcarriers, are utilized that change position, i.e. "hop", from block to block. In this manner, the information-bearing symbols and training symbols are received in a format in which the training symbols are easily separated from the information-bearing symbols, thereby enabling CFO estimation to be performed prior to channel estimation.

In one embodiment, the invention is directed to a method comprising forming blocks of symbols by inserting training symbols within two or more blocks of information-bearing symbols; applying a hopping code to each of the blocks of symbols to insert a null subcarrier at a different position within each of the blocks of symbols; and outputting wireless transmission signal in accordance with the blocks of symbols.

In another embodiment, the invention is directed to a method comprising receiving a wireless signal transmitted from a stream of blocks of symbols, wherein each block of symbols includes one or more information-bearing symbols, one or more training symbols, and at least one null subcarrier at a different position within each of the blocks of symbols. The method further comprises outputting estimated symbols based on the received wireless signal.

In another embodiment, the invention is directed to a wireless communication device comprising a training symbol insertion module to form blocks of symbols by inserting training symbols within two or more blocks of information-bearing symbols, wherein the training symbol insertion module applies a hopping code to each of the blocks of symbols to insert a null subcarrier at a different position within each of the blocks of symbols; and a modulator to output a wireless transmission signal in accordance with the blocks of symbols.

In another embodiment, the invention is directed to a wireless communication device comprising: one or more antennas that receive a wireless signal transmitted from a stream of blocks of symbols, wherein each block of symbols includes one or more information-bearing symbols, one or more training symbols, and at least one null subcarrier at a different position within each of the blocks of symbols; an carrier frequency offset estimator to estimate a carrier frequency offset of the received signal based on the positions of the null subcarriers; and a decoder to output a stream of estimated symbols based on the received wireless signal and the estimated carrier frequency offset.

In another embodiment, the invention is directed to a computer-readable medium containing instructions. The instructions cause a programmable processor to form blocks of symbols by inserting training symbols within two or more blocks of information-bearing symbols; apply a hopping code to each of the blocks of symbols to insert a null subcarrier at a different position within each of the blocks of symbols; and output wireless transmission signal in accordance with the blocks of symbols.

The described techniques may offer one or more advantages. For example, instead of performing CFO and MIMO channel estimation on a per block basis, several transmission blocks are collected by a receiver for estimating CFO and the MIMO frequency-selective channels, thereby resulting in an efficient use of bandwidth. Further, because the training symbols are inserted in a manner that decouples CFO and channel estimation from symbol detection, low-complexity CFO and channel estimation can be performed. Moreover, the described techniques allow for full acquisition range of the CFO estimator and identifiability of the MIMO channel estimator.

Other advantages of performing block equalization may include improved bit-error-rate (BER) performance relative to typical techniques and flexibility to adjust the number of blocks collected to perform channel estimation. Because of the improved BER performance, less expensive voltage controlled oscillators may be used. Additionally, the training patterns of the described techniques can easily be implemented by current OFDM standards, such as IEEE 802.11a and IEEE 802.11g.

The details of one or more embodiments of the invention are set forth in the accompanying drawings and the description below. Other features, objects, and advantages of the invention will be apparent from the description and drawings, and from the claims.

DETAILED DESCRIPTION

Throughout the Detailed Description bold upper letters denote matrices, bold lower letters stand for column vectors, $(\bullet)^T$ and $(\bullet)^H$ denote transpose and Hermitian transpose, respectively; $(\bullet)^*$ denotes conjugate and $\lfloor \bullet \rfloor$ denotes the nearest integer. $E[\bullet]$ stands for expectation and $\text{diag}[x]$ stands for a diagonal matrix with x on its main diagonal; matrix $D_N(h)$ with a vector argument denotes an N×N diagonal matrix with $D_N(h)=\text{diag}[h]$. For a vector, $\|\bullet\|$ denotes the Euclidian norm. $[A]_{k,m}$ denotes the (k, m)th entry of a matrix A, and $[x]_m$ denotes the mth entry of the column vector x; $I_N$ denotes the N×N identity matrix; $e_i$ denotes the (i+1)st column of $I_N$; $[F_N]_{m,m}=N^{(1/2)}\exp(-j2\pi mn/N)$ denotes the N×N fast fourier transform (FFT) matrix; and we define $f:=[1, \exp(j\omega), \ldots, \exp(j(N-1)\omega)]^T$.

Figure 1:
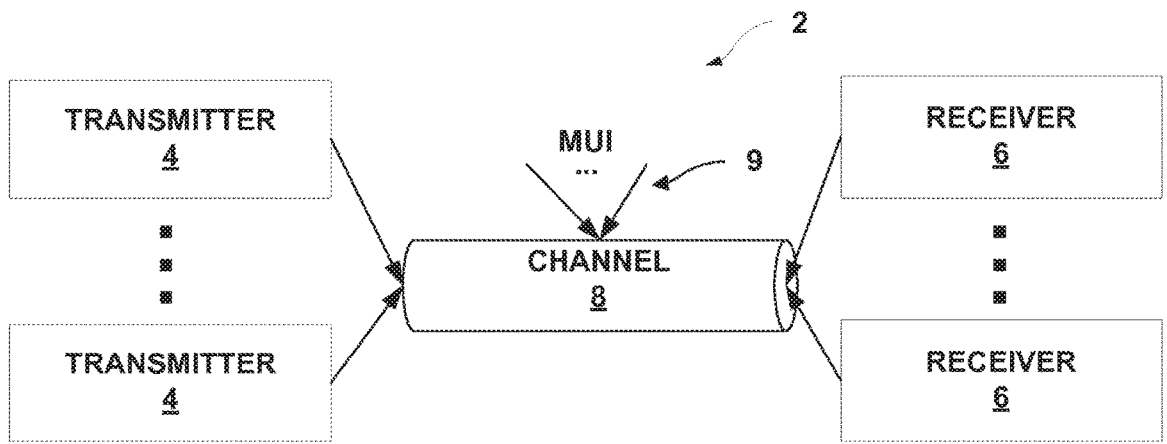
FIG. 1 is a block diagram illustrating an exemplary wireless multi-user communication system in which multiple transmitters communicate with multiple receivers through a wireless communication channel.

FIG. 1 is a block diagram illustrating a multi-user wireless communication system 2 in which multiple transmitters 4 communicate with multiple receivers 6 through wireless communication channel 8. In general, the invention describes techniques for performing carrier frequency offset (CFO) and channel estimation of orthogonal frequency division multiplexing (OFDM) transmissions output by transmitters 4 over multiple-input multiple-output (MIMO) frequency-selective fading channel 8. As described herein, the techniques maintain orthogonality among subcarriers of OFDM transmissions through channel 8 allowing low-complexity receivers 6 and full acquisition range of the CFO.

Transmitters 4 output a transmission signal in accordance with a block of symbols in which two or more training symbols are inserted and in which a hopping code is applied. A block of training symbols including two or more training symbols may be inserted within a block of space-time encoded information-bearing symbols. A hopping code may then be applied to the resulting block of symbols to insert a null subcarrier, i.e. zero symbol, within the block symbols such that the null subcarrier changes position, i.e. "hops", from block to block. Unlike conventional systems in which training symbols are inserted within a single transmission block, the techniques described herein insert training symbols over two or more transmission blocks. Consequently, transmitters 4 may insert a sequence of training symbols over two or more transmission blocks, thereby increasing bandwidth efficiency because smaller blocks of training symbols may be used. Receivers 6 may then collect the training symbols inserted within the two or more transmission blocks in order to perform channel estimation. Furthermore, the information-bearing symbols and training symbols are received through communication channel 8 by receivers 6 in a format in which the training symbols are easily separated from the information-bearing symbols, thereby enabling CFO estimation to be performed prior to channel estimation. As a result, the techniques described herein may have improved bit-error-rate (BER) performance over conventional alternatives.

The described techniques can work with any space-time encoded transmission and is backwards compatible with OFDM which has been adopted as a standard for digital audio broadcasting (DAB) and digital video broadcasting (DVB) in Europe and high-speed digital subscriber lines (DSL) in the United States. OFDM has also been proposed for local area mobile wireless broadband standards including IEEE 802.11a, IEEE 802.11g, MMAC and HIPERLAN/2.

The techniques described herein apply to uplink and downlink transmissions, i.e., transmissions from a base station to a mobile device and vice versa. Transmitters 4 and receivers 6 may be any device configured to communicate using a multi-user wireless transmission including a cellular distribution station, a hub for a wireless local area network, a cellular phone, a laptop or handheld computing device, a personal digital assistant (PDA), a Bluetooth™ enabled device, and other devices.

Figure 2:
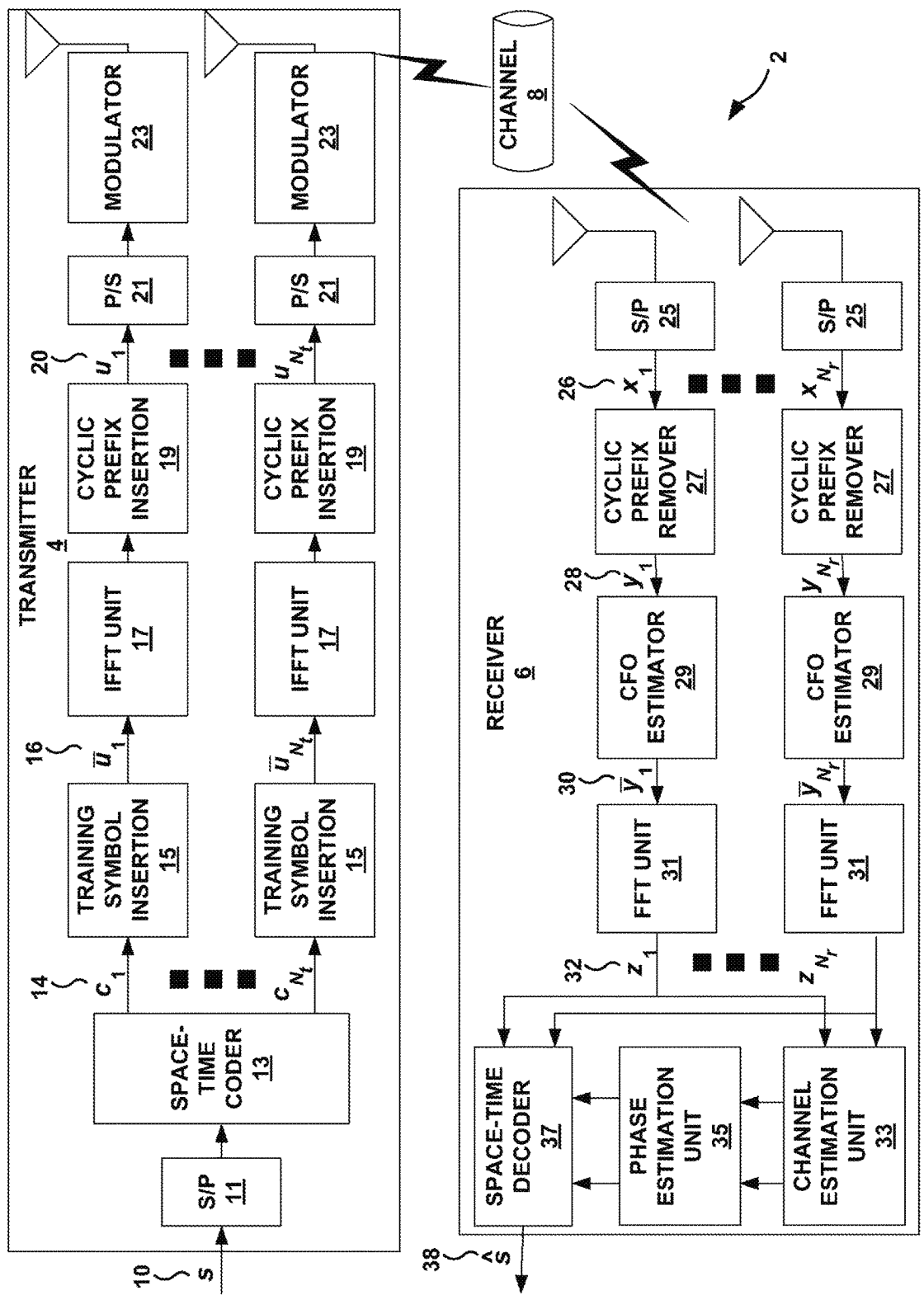
FIG. 2 is a block diagram illustrating in further detail one embodiment of a transmitter and a receiver within the multi-user communication system of FIG. 1.

FIG. 2 is a block diagram illustrating in further detail the multi-user communication system of FIG. 1. In particular, FIG. 2 illustrates exemplary embodiments of multi-antenna transmitter 4 and multi-antenna receiver 6 communicating over MIMO frequency-selective channel 8 in the presence of a CFO. Multi-antenna transmitter 4 and multi-antenna receiver 6 have $N_t$ and $N_r$ antennas, respectively. While OFDM transmissions are inherently resilient to multipath fading, OFDM transmissions are more sensitive to frequency offsets than single carrier systems. Frequency offsets can occur when a voltage controlled oscillator (VCO) of receiver 6 is not oscillating at exactly the same carrier frequency as a VCO of transmitter 4 and can also occur as a result of the Doppler effect. When the frequency offset is permanent, it is typically referred to as a carrier frequency offset and when the frequency offset varies over time, it is typically referred to as phase noise. Frequency offsets cause a degradation in BER performance because the orthogonality among subcarriers is destroyed and the subcarriers can interfere with each other.

Generally, receiver 6 corresponds to a particular user performing CFO and channel estimation of OFDM transmissions output by transmitter 4 through MIMO frequency-selective fading channel 8 in the presence of a CFO. Each information-bearing symbol s(n) 10 is selected from a finite alphabet and input into serial to parallel converter (S/P) 11 which parses $N_s$ information-bearing symbols from a serial stream of information-bearing symbols into blocks of information-bearing symbols. The nth entry of the kth block of the block of information-bearing symbols is denoted $[s(k)]_n = s(kN_s+n)$. Space-Time coder 13 encodes and/or multiplexes each block s(k) in space and time to yield blocks $\{c_\mu(k)\}_{\mu=1}^{N_t}$ 14 of length $N_c$. Space-Time coder 13 may apply any space-time code to yield blocks $\{c_\mu(k)\}_{\mu=1}^{N_t}$ 14 for each respective transmit antenna of multi-antenna transmitter 4.

Each of training symbol insertion units 15 inserts two or more training symbols, which may have non-zero or zero values, within space-time encoded blocks $\{c_\mu(k)\}_{\mu=1}^{N_t}$ 14 and applies a hopping code to blocks $\{c_\mu(k)\}_{\mu=1}^{N_t}$ 14 to form a vectors $\bar{u}_\mu(k)$ 16 with length N for the μth antenna of multi-antenna transmitter 4. Applying the hopping code inserts a null subcarrier which changes position, i.e. "hops", from block to block. Each subcarrier corresponding to a zero symbol is referred to as a null subcarrier. Unlike conventional systems in which training symbols are inserted within a single transmission block, each of training symbol insertion units 15 may insert training symbols over two or more blocks. Consequently, transmitter 4 may insert a sequence of training symbols over two or more blocks $\{c_\mu(k)\}_{\mu=1}^{N_t}$ 14. Sparsely inserting training symbols increases the bandwidth efficiency of communication system 2 because fewer training symbols may be inserted per block $\{c_\mu(k)\}_{\mu=1}^{N_t}$ 14. In some embodiments, each of training symbol insertion units 15 may insert a particular number of training symbols per block $\{c_\mu(k)\}_{\mu=1}^{N_t}$ 14 based on channel 8's coherence time and the pertinent burst duration, e.g. if the burst is long fewer training symbols may be inserted per block $\{c_\mu(k)\}_{\mu=1}^{N_t}$ 14.

Furthermore, training symbols may be inserted in accordance with existing OFDM standards such as IEEE 802.11a and IEEE 802.11g. Training symbol insertion units 15 are described in greater detail below using notation introduced in the following paragraphs.

Subsequent to the insertion of training symbols, MIMO OFDM is implemented. In particular, each of inverse fast Fourier transform (IFFT) units 17 implement N-point IFFT via left multiplication with $F_N^H$ on each corresponding block $\bar{u}_\mu(k)$ 16 and each of cyclic prefix insertion units 19 insert a cyclic prefix via left multiplication with the appropriate matrix operator $T_{cp} := [I_{L\times N}^T\ I_N^T]^T$, where $I_{L\times n}^T$ represents the last L columns of $I_N$. Each of parallel to serial converters (P/S) 21 then parses the resulting blocks $\{u_\mu(k) = T_{cp}\ F_N^H\ \bar{u}_\mu(k)\}_{\mu=1}^{N_t}$ of size P×1 into a serial symbol stream. Each of modulators 23 modulate the corresponding P×1 blocks which are transmitted by the $N_t$ transmit antennas over frequency-selective communication channel 8.

Generally, communication channel 8 can be viewed as an $L^{th}$ order frequency-selective channel from the μth transmit antenna of transmitter 4 to the vth receive antenna of receiver 6. Consequently, communication channel 8 can be represented in the discrete-time equivalent form $h^{(v,\mu)}(l)$, 1 ε [0, L] and incorporates transmit and receive filters, $g_\mu(t)$ and $g_v(t)$ respectively, as well as frequency selective multipath $g_{v,\mu}(t)$, i.e. $h^{(v,\mu)}(l) = (g_\mu \ast g_{v,\mu} \ast g_v)(t)\ |t=lT$, where $\ast$ denotes convolution and T is the sampling period which may be chosen to be equivalent to the symbol period.

Transmissions over communication channel 8 experience a frequency offset, $f_0$ in Hertz, which may be caused by a mismatch between a voltage controlled oscillator (VCO) of transmitter 4 and a VCO of receiver 6 or may also be caused by the Doppler effect. In the presence of a frequency offset, the samples at vth receive antenna can be represented according to equation (1) below, where $\omega_0 := 2\pi f_0 T$ is the normalized CFO, $N_r$ is the number of receive antennas, and $n_v(n)$ is zero-mean, white, complex Gaussian distributed noise with variance $\sigma^2$.

$$X_v(n) = \sum_{\mu=1}^{N_t} e^{j w_v n} \sum_{l=0}^{L} h^{(v,\mu)}(l) u_\mu(n-1) + \eta_v(n), v \in [1, N_r] \quad (1)$$

Each of serial to parallel converters (S/P) 25 convert a respective received sequence x(n) into a corresponding P×1 block 26 with entries $[x_v(k)]_p := x_v(kP+p)$. By selecting block size P greater than channel order L each received block $x_v(k)$ 26 depends only on two consecutive transmitted blocks, $u_\mu(k)$ and $u_\mu(k-1)$ which is referred to as inter-block interference (IBI). In order to substantially eliminate IBI at receiver 6, each of cyclic prefix removers 27 removes the cyclic prefix of the corresponding blocks $x_v(k)$ 26 by left multiplication with the matrix $R_{cp} := [0_{N\times L}\ I_N]$. The resulting IBI-free block can be represented as $y_v(k) := R_{cp} x_v(k)$ 28. Equation (2) below can be used to represent the vector-matrix input-output relationship, where $\eta_v(k) := [\eta_v(kP), \eta_v(kP+1), \ldots, \eta_v(kP+P-1)]^T$, with P=N+L; $H^{(v,\mu)}$ is a P×P lower triangular Toeplitz matrix with first column $[h^{(v,\mu)}(0), \ldots, h^{(v,\mu)}(L), 0 \ldots, 0]^T$; and $D_P(\omega_0)$ is a diagonal matrix defined as $D_P(\omega_0) := \mathrm{diag}[1, e^{j\omega_0}, \ldots, e^{j\omega_0(P-1)}]$.

$$y_v(k) = \sum_{\mu=1}^{N_t} e^{j w_v kP} R_{cp} D_P(w_o) H^{(v,\mu)} T_{cp} F_N^H \bar{u}_\mu(k) + R_{cp} \eta_v(k), v \in [1, N_r] \quad (2)$$

Based on the structure of the matrices involved, it can be readily verified that $R_{cp}D_P(w_v)=e^{jw_0L}D_N(w_v)R_{cp}$, where $D_N(w_v):=\text{diag}[1, e^{jw_0}, \ldots, e^{jw_0(P-1)}]$. Following this identity, we define the N×N matrix $\tilde{H}^{(v,\mu)}:=R_{cp}H^{(v,\mu)}T_{cp}$ as a circulant matrix with first column $[h^{(v,\mu)}(0), \ldots, h^{(v,\mu)}(L), 0, \ldots, 0]^T$. Letting also $v_v(k):=R_{cp}\eta_v(k)$, equation (2) can be rewritten according to equation (3).

$$y_v(k) = e^{jw_v(kP+L)} D_N(w_o) \sum_{\mu=1}^{N_t} \tilde{H}^{(v,\mu)} F_N^H \bar{u}_\mu(k) + v_v(k), \quad v \in [1, N_r] \quad (3)$$

In the absence of a CFO, taking the FFT of $y_v(k)$ 28 renders the frequency-selective channel 8 equivalent to a set of flat-fading channels, since $F_N^H \tilde{H}^{(v,\mu)} F_N^H$ is a diagonal matrix $D_N(\tilde{h}^{(v,\mu)})$, where $\tilde{h}^{(v,\mu)}:=[\tilde{h}^{(v,\mu)}(0), \ldots, \tilde{h}^{(v,\mu)}(2\pi(N-1)/N)]^T$, with $$\tilde{h}^{(v,\mu)}(2\Pi n/N) := \sum_{l=0}^{L} \tilde{h}^{(v,\mu)}(l)\exp(-j2\pi l/N)$$

representing the (v, μ)th channel's frequency response vales on the FFT grid. However, in the presence of a CFO, the orthogonality of subcarriers is destroyed and the channel cannot be diagonalized by taking the FFT of $y_v(k)$ 28. In order to simplify the input-output relationship, $F_N^H F_N = I_N$ can be inserted between $D_N(w_0)$ and $\tilde{H}^{(v,\mu)}$ to re-express equation (3) as equation (4).

$$y_v(k) = e^{jw_v(kP+L)} D_N(w_o) \sum_{\mu=1}^{N_t} F_N^H D_N(\tilde{h}^{(v,\mu)}) \bar{u}_\mu(k) + v_v(k), \quad v \in [1, N_r] \quad (4)$$

From equation (4) it can be deduced that estimating the CFO and the multiple channels based on $\{y_v(k)\}_{v=1}^{N_r}$ 28 is a nonlinear problem. Given $\{y_v(k)\}_{v=1}^{N_r}$ 28, the CFO $\omega_0$ and the $N_tN_r$ channels $h^{(v,\mu)}:=[h^{(v,\mu)}(0), \ldots, h^{(v,\mu)}(L)]^T$ in MIMO OFDM communication system 2 are estimated based on the training symbols inserted by training symbol insertion unit 15.

Although $\bar{u}_\mu(k)$ 16 contains both information-bearing symbols and training symbols, separation of the information-bearing symbols and training symbols is challenging due to the presence of CFO $\omega_0$. Each of training symbol insertion units 15 inserts two or more training symbols within the corresponding information-bearing symbols $c_\mu(k)_{\mu=1}^{N_t}$ 14 so that CFO estimation can be separated from MIMO channel estimation. The insertion of the training symbols is performed in two steps.

In the first step, each of training symbol insertion units 15 inserts a block of training symbols $b_\mu(k)$ into the corresponding block of information bearing symbols $c_\mu(k)_{\mu=1}^{N_t}$ 14 in accordance with equation (5), where the two permutation matrices $P_A$, $P_B$ have sizes $K \times N_c$ and $K \times N_b$ respectively, and are selected to be mutually orthogonal, i.e. $P_A^T P_B = 0_{N_c \times N_b}$.

$$\tilde{u}_\mu(k) = P_A c_\mu(k) + P_B b_\mu(k) \quad (5)$$

It is important to note that $N_c + N_b = K$ and $K < N$. In some embodiments, $P_A$ may be formed with the last $N_c$ columns of $I_{N_c+N_b}$, and $P_B$ with the first $N_b$ columns of $I_{N_c+N_b}$ in accordance with equations (6) and (7), respectively.

$$P_A = [e_{N_b}, \ldots, e_{K-1}] \quad (6)$$

$$P_A = [e_0, \ldots, e_{N_b-1}] \quad (7)$$

Figure 3:
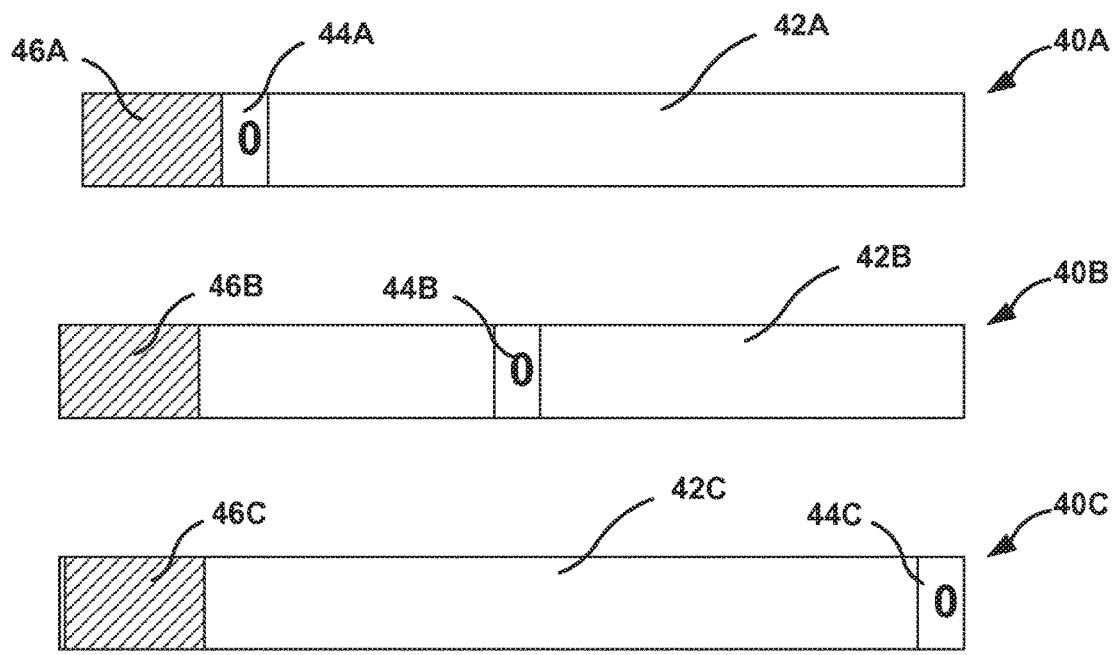
FIG. 3 illustrates example transmission blocks generated by the transmitter of FIG. 2.

The block of training symbols $b_\mu(k)$ may comprise two or more training symbols and has length $N_b$. Moreover, $b_\mu(k)$ may be one block of training symbols in a training sequence including two or more blocks of training symbols. By sparsely inserting the training symbols, bandwidth efficiency of communication system 2 can be increased. The resulting structure of $\tilde{u}_\mu(k)$ in equation (5) is illustrated in FIG. 3. The structure of $b_\mu(k)$ is described in greater detail below.

In the second step, N–K zeros are inserted per block $\tilde{u}_\mu(k)$ to obtain $\bar{u}_\mu(k)$. This insertion can be implemented by left-multiplying $\tilde{u}_\mu(k)$ with the hopping code $T_{sc}$ given in equation (8), where $q_k := k\lfloor N/(L+1) \rfloor$.

$$T_{sc}(k) := [e_{qk(\text{mod } N)}, \ldots, e_{qk+K-2(\text{mod } N)}] \quad (8)$$

Applying the hopping code given in equation (8) inserts a zero symbol referred to as a null subcarrier in each block $\tilde{u}_\mu(k)$. Dependence of $T_{sc}$ on the block index k implies that the position of the inserted null subcarrier changes from block to block. In other words, equation (8) implements a null subcarrier "hopping" operation from block to block. By substituting equations (8) and (5) into equation (4) it can be deduced that the resulting signal at the vth receive antenna takes the form of equation (9) given below.

$$y_v(k) = \sum_{\mu=1}^{N_t} e^{jw_v(kP+L)} D_N(w_v) F_N^H D_N(\tilde{h}_N^{v,\mu}) T_{sc}(k) \tilde{u}_\mu(k) + v_v(k) \quad (9)$$

Therefore, each of training symbol insertion units 15 inserts zero and non-zero training symbols which are used by each of CFO estimators 29 and channel estimation unit 33 to estimate the CFO $\omega_0$ and communication channel 8. The null subcarrier is inserted so that the position of the null subcarrier hops from block to block and enables CFO estimation to be separated from MIMO channel estimation. Consequently, the identifiability of the CFO estimator can be established and the minimum mean square error (MMSE) of the MIMO channel estimator can be achieved.

If CFO $\omega_0$ was absent, i.e. $\omega_0 = 0$, then the block of training symbols $b_\mu(k)$ could be separated from the received OFDM transmission signal and by collecting the training blocks of a training sequence, communication channel 8 could be estimated using conventional techniques. However, the CFO destroys the orthogonality among subcarriers of the OFDM transmission signal and the training symbols are mixed with the unknown information-bearing symbols and channels. This motivates acquiring the CFO first, and subsequently estimating the channel.

Each of CFO estimators 29 applies a de-hopping code in accordance with equation (10) on a per block basis.

$$D_N^H(k) = \text{diag}\left[1, e^{-j\frac{2\pi}{N}qk}, \ldots, e^{-j\frac{2\pi}{N}qk(N-1)}\right] \quad (9)$$

Because hopping code $T_{sc}$ is a permutation matrix and $D_N(\tilde{h}^{(v,\mu)})$ is a diagonal matrix, it can be verified that $D_N(\tilde{h}^{(v,\mu)}) T_{sc}(k) = T_{sc}(k) D_K(\tilde{h}^{(v,\mu)}(k))$, where $\tilde{h}^{(v,\mu)}$ is formed by permuting the entries of $\tilde{h}^{(v,\mu)}$ as dictated by $T_{sc}(k)$. Using the de-hopping code given in equation (10), the identity given in equation (11) can be established, where $T_{zp} := [I_K 0_{K \times (N-K)}]$ is a zero-padding operator.

$$D_N^H(k) F_N^H T_{sc}(k) = F_N^H T_{zp} \quad (11)$$

By multiplying equation (9) by the de-hopping code and using equation (11), equation (12) is obtained, where $$g_v(k) := \sum_{\mu=1}^{N_t} D_K(\tilde{h}^{(v,\mu)}(k))\tilde{u}_\mu(k)$$

and $\bar{v}_v(k):=D_N^H(k)v_v(k)$.

$$\bar{y}_v(k)=D_N^H(k)y_v(k)=e^{jw_v(kP+L)}D_N(w_v)F_N^H T_{zp}g(k)+\bar{v}_v(k) \quad (12)$$

Equation (12) shows that after de-hopping, null subcarriers in different blocks are at the same location because $T_{zp}$ does not depend on the block index k.

As a result, the covariance matrix of $\bar{y}_v(k)$ 30 is given according to equation (13) where the noise $\bar{v}_v(k)$ has covariance matrix $\sigma^2 I_N$.

$$R_{\bar{y}v}=D_N(w_0)F_N^H T_{zp}E[g(k)g^H(k)]\bullet T_{zp}^H F_N D_N^H(w_v)+\sigma^2 I_N \quad (13)$$

Assuming that the channels are time invariant over M blocks, and the ensemble correlation matrix $R_{\bar{y}v}$ is replaced by its sample estimate given in equation (14) which is formed by averaging across M blocks, where M>K.

$$\hat{R}_{yv} = \frac{1}{M}\sum_{k=0}^{M-1} \bar{y}_v(k)\bar{y}_v^H(k) \quad (14)$$

The column space of $R_{\bar{y}v}$ has two parts: the signal subspace and the null subspace. In the absence of CFO, if $E[g(k)g^H(k)]$ has full rank, the null space of $R_{\bar{y}v}$ is spanned by the missing columns, i.e. the location of the null subcarriers, of the FFT matrix. However, the presence of CFO introduces a shift in the null space. Consequently, a cost function can be built to measure this CFO-induced phase shift. Representing the candidate CFO as $\omega$, this cost function can be written according to equation (15), where $$\sum_{v=1}^{N_r} R_{\bar{y}v} = D_N(W_o)F_N^H T_{zp}\left\{\sum_{v=1}^{N_r}E[g(k)g^H(k)]\right\}T_{zp}F_N D_N(w_o).$$

$$J_V(\omega) := \sum_{k=K}^{N-1} f_N^H\left(\frac{2\pi k}{N}\right)D_N^{-1}(\omega)R_{\bar{y}v}D_N(\omega)f_N\left(\frac{2\pi k}{N}\right) \quad (15)$$

Consequently, if $\omega=\omega_0$, then $D_N(\omega_0-\omega)=I_N$. Next, recall that the matrix $F_N^H T_{zp}$ is orthogonal to $\{f_N(2\pi n/N)\}_{n=K}^{N-1}$. Therefore, if $\omega=\omega_0$, the cost function $J(\omega_0)$ is zero in the absence of noise. However, for this to be true, $\omega_0$ must be the unique minimum of $J(\omega)$. $\omega_0$ is the unique zero of $J(\omega)$ if $$\sum_{v=1}^{N_r} E[g(k)g^H(k)]$$

has full rank as established in Proposition 1 below.

If $E[b_\mu(k)b_{\mu H}^H(k)]$ is diagonal,     Proposition 1

$$\sum_{v=1}^{N_r} E[b_\mu(k)b_{\mu H}^H(k)] \text{ has full rank,}$$

$E[c_\mu(k)c_{\mu H}^H(k)] = 0$, and $E[b_{\mu 1}(k)b_{\mu 2}^H(k)] = 0$, $\forall \mu 1, \neq \mu 2$, then $\sum_{v=1}^{N_r} E[g_v(k)g_v^H(k)]$ has full rank.

Training block $b_\mu(k)$ satisfies the conditions of proposition 1. Using the result of Proposition 1, $$\sum_{v=1}^{N_r} E[g_v(k)g_v^H(k)]$$

has full rank, it follows that $J(\omega) \geq J(\omega_0)$, where the equality holds if and only if $\omega=\omega_0$. Therefore, CFO estimates $\omega_0$ can be found by minimizing $J(\omega)$ according to equation (16).

$$w_0 = \arg_\omega{}^{min} J_v(\omega) \quad (16)$$

Because of subcarrier hopping, $J(\omega)$ has a unique minimum in $[-\pi, \pi)$ regardless of the position of channel nulls. This establishes identifiability of $\hat{\omega}_0$ and shows that the acquisition range of the CFO estimator given in equation (16) is $[-\pi/\pi)$, which is the full range.

Based on the CFO estimates produced by equation (16), the terms that depend on $\omega_0$ can be removed from $\{\bar{y}_v(k)\}_{k=0}^{M-1}$ 30 and channel estimation can be performed. In order to derive the MIMO channel estimator, the CFO estimate is temporarily assumed to be perfect, i.e. $\omega_0=\hat{\omega}_0$. After each of CFO estimators 29 remove the CFO related terms from $\bar{y}_v(k)$30, each of FFT units 31 take the FFT of the corresponding block $\bar{y}_v(k)$30 and removes the null subcarriers by multiplying the corresponding blocks $\bar{y}_v(k)$30 with $T_{zp}^T$ to obtain $z_v(k)$ 32 according to equation (17), where $\xi_v(k):=e^{-j\omega_0(kP+L)}T_{zp}^T F_N D_N^{-1}(\hat{\omega}_0)\bar{v}_v(k)$.

$$z_v(k) = e^{-j\omega(kP+L)}T_{zp}^T F_N D_N^{-1}(\hat{\omega}_0)\bar{y}_v(k) = \quad (17)$$

$$\sum_{\mu=1}^{N_t} D_K(\tilde{h}^{(v,\mu)}(k))(P_A c_\mu(k) + P_B b_\mu(k)) + \xi_v(k)$$

From the design of $P_A$ and $P_B$ in equations (6) and (7) respectively, it can be inferred that $P_A^T D_K(\tilde{h}^{(v,\mu)}(k))P_B=0$. This allows the training symbols to be separated from the received information-bearing symbols in accordance with equations (18) and (19), where equation (18) represents the received information-bearing symbols and equation (19) represents the received training symbols.

$$z_{v,c}(k) := P_A^T z_v(k) = \sum_{\mu=1}^{N_t} P_A^T D_K(\tilde{h}^{(v,\mu)}(k))P_A c_\mu(k) + \xi_{v,c}(k) \quad (18)$$

$$z_{v,b}(k) := P_B^T z_v(k) = \sum_{\mu=1}^{N_t} P_B^T D_K(\tilde{h}^{(v,\mu)}(k))P_B b_\mu(k) + \xi_{v,b}(k) \quad (19)$$

$\xi_{v,c}(k):=P_A^T\xi_v(k)$ and $+\xi_{v,b}(k):=P_B^T\xi_v(k)$. By the definitions of $P_B$ in equation (6) and the de-hopping code in equation (11), the identity in equation (20) can be formed, where $\tilde{h}_b^{(v,\mu)}$ comprises the first $N_b$ entries of $\tilde{h}^{(v,\mu)}$, the $N_b\times(L+1)$ matrix $F(k)$ comprises the first $L+1$ columns and $q_k$ related $N_b$ rows of $F_N$, and $h^{(v,\mu)}:=[h^{(v,\mu)}(0),\ldots,h^{(v,\mu)}(L)]^T$.

$$D_K(\tilde{h}^{(v,\mu)}(k))P_B = P_B D_{N_b}(\tilde{h}_b^{(v,\mu)}(k)) = P_B \operatorname{diag}[F(k)h^{(v,\mu)}] \quad (20)$$

Because $P_B^T P_B = I_{N_b}$, equation (20) can be re-expressed according to equation (21) where $B_\mu(k):=\operatorname{diag}[b_\mu(k)]$.

$$z_{V,B}(k) = \sum_{\mu=1}^{N_t} B_\mu(k)F(k)h^{(v,\mu)} + \xi_{v,b}(k) \quad (21)$$

Note that the length for each block of training symbols, $N_b$, can be smaller than $N_t(L+1)$ by sparsely distributing training symbols across blocks. In some embodiments, $N_t+1$ training symbols are inserted every $N+L$ transmitted symbols resulting in a bandwidth efficiency of $(N-N_t-1)/(N+L)$. Collecting M blocks $z_{v,b}(k)$, the input-output relationship based on training symbols and channels can be expressed according to equation (22), where $h_v$ comprises $\{h^{(v,\mu)}\}_{\mu=1}^{N_t}$, $\bar{\xi}_{v,b}:=[\xi_{v,b}^T(0),\ldots,\xi_{v,b}^T(M-1)]^T$, and B is given in equation (23). Note that B is the same for all $N_r$ receive antennas $$\bar{z}_{vp} = Bh_v + \bar{\xi}_{v,b} \quad (22)$$

$$B = \begin{pmatrix} B_1(0)P_B^T F(0) & \cdots & B_{N_T}(0)P_B^T F(0) \\ \vdots & \ddots & \vdots \\ B_1(M-1)P_B^T F(M-1) & \cdots & B_{N_t}(M-l)P_B^T F(M-1) \end{pmatrix} \quad (23)$$

By collecting $z_{v,b}$'s from all $N_t$ transmit antennas into $\bar{z}_b:=[\bar{z}_{1,b}^T,\ldots,\bar{z}_{N_r b}^T]^T$, the linear MMSE (LMMSE) channel estimator can be expressed according to equation (24), where $R_h:=E[hh^H]$ with $h:=[h_1^T,\ldots,h_{N_r}^T]^T$ as the channel covariance matrix, and $\sigma^2$ represents the noise variance.

$$\hat{h}_{LMMSE}:=(\sigma^2 R_h^{-1} + I_{N_r}\otimes(B^H B))^{-1}(I_{N_r}\otimes B^H)\bar{z}_b \quad (24)$$

$R_h$ is typically unknown, thus, $MN_b \geq N_t(L+1)$, and $B^H B$ is selected to have full rank. In some embodiments, channel estimation unit 33 is a least squares (LS) estimator given according to equation (25).

$$\hat{h}_{LS}:=(I_{N_r}\otimes(B^H B))^{-1}(I_{N_r}\otimes B^H)\bar{z}_b \quad (25)$$

If the number of training symbols per block is $N_b=N_t$, a minimum number of $M=L+1$ blocks are required to be collected by receiver 6 in order to guarantee that LS estimation can be performed since $h^{(v,\mu)}$ with $L+1$ entries are estimated at the vth receive antenna. In some embodiments, channel estimation unit 33 can be adjusted to collect a variable number of blocks based on the complexity that can be afforded.

The number of $b_\mu(k)$'s satisfying the conditions of Proposition 1 is not unique. For example, $N_b=N_t$ may be selected and the training sequences for different transmit antennas may be designed according to equation (26).

$$b_\mu(k)=[0_{\mu-1}^T, b, 0_{N_t-\mu}^T]^T \quad (26)$$

Further, assume N and M are integer multiples of $L+1$. Because the hopping step size in equation (8) is $N/(L+1)$, $B^H B$ can be designed according to equation (27).

$$B^H B = \begin{bmatrix} \sum_{m=0}^{M-1} F^H(m)B_1^H(m)B_1(m)F(m) & & \\ & \ddots & \\ & & \sum_{m=0}^{M-1} F^H(m)B_{N_t}^H(m)B_{N_t}(m)F(m) \end{bmatrix} = \frac{|b|^2 M}{N} I_{N_t(L+1)} \quad (27)$$

Therefore, the number of blocks N improves channel estimation performance. However, this is true when CFO estimation is perfect. When CFO estimation is imperfect, the contrary is true: fewer blocks should be used because the residual CFO estimation error degrades BER performance when the block index is large.

Thus far, the CFO and $N_tN_r$ channels have been estimated, but a residual CFO referred to as phase noise remains. Phase noise degrades the BER severely as the number of blocks used for channel estimation increases.

Using the CFO offset $\hat{\omega}_0$ produced by each of CFO estimators 29, the received transmission block can be expressed according to equation (28) where $\hat{\omega}_0-\omega_0$ is the phase noise and $\xi_v(k):=e^{-j\hat{\omega}_0(kP+L)}T_{zp}^T F_N D_N^{-1}(\hat{\omega}_0)\bar{v}_v(k)$.

$$\tilde{y}_v(k)=e^{-j(\omega_0-\hat{\omega}_0)(kP+L)}D_N(\omega_0-\hat{\omega}_0)F_N^H T_{zp}g_v(k)+\xi_v(k) \quad (28)$$

When $\hat{\omega}_0$ is sufficiently accurate, the matrix $D_N(\omega_0-\hat{\omega}_0)$ can be approximated by an identity matrix of the same size. However, the phase term $(\hat{\omega}_0-\omega_0)(kP+L)$ becomes increasingly large as the block index k increases. Without mitigating the phase noise, it degrades not only the performance of channel estimation unit 33, but also the BER performance over time.

In order to enhance the BER performance, phase estimation unit 35 uses the non-zero training symbols in $b_\mu(k)$, which were previously designed to estimate channel 8, to estimate the phase noise per block. For example, assume that for the kth block, the estimated channel is obtained by using the LMMSE channel estimator given in equation (24). Further, also assume that the training sequence is designed as given in equation (26) and that channel estimation is perfect, i.e. $D_N(\omega_0-\hat{\omega}_0)\approx I_N$. As a result, after equalizing channel 8, for the vth receive antenna and the μth entry of $z_{v,b}(k)$ 30, the equivalent input-output relationship is given according to equation (29), where $\phi_v(k):=[z_{v,b}(k)]_\mu/[\tilde{h}_v^{(v,\mu)}]_\mu$, and $w_v$ is the equivalent noise term after removing the channel.

$$\phi_v(k)=e^{-j(\omega_0-\hat{\omega}_0)(kP+L)}b+w_v \quad (29)$$

Because $b$, is known the phase $(\hat{\omega}_0\omega_0)(kP+L)$ can be estimated based on the observations from $N_r$ receive antennas on a per block basis. In order to perform this phase estimation step, additional training symbols do not need to be inserted and the extra complexity is negligible. The performance improvement resulting from phase estimation is illustrated the performance graphs given below.

After CFO estimation, the FFT has been performed, and channel estimation space-time decoder 37 decodes the space-time encoded information-bearing symbols to produce the information-bearing symbol estimates $\hat{s}$ 38.

Although estimation for a single common CFO and MIMO channel has been described in a single-user system involving $N_t$ transmit antennas and $N_r$ receive antennas, communication system 2 is not limited to such systems. Communication system 2, can easily be modified to estimate CFOs and channel in a multi-user downlink scenario where the base station deploys $N_t$ transmit antennas to broadcast OFDM based transmissions to $N_r$ mobile stations each of which is equipped with one or more antennas. In this case, there are $N_r$ distinct CFOs and $N_t N_r$ frequency-selective channels to estimate. However, each mobile station can still apply perform CFO estimation as given in equation (16). In addition, it can be verified that the LS channel estimator given in equation (25) can be separated from CFO estimation to estimate the $N_t$ channel impulse responses in $h_v$, for $v=1, \ldots, N_r$, on a per receive antenna basis.

FIG. 3 illustrates example transmission blocks 40A, 40B, and 40C generated by transmitter 4 of communication system 2. In particular, transmission blocks 40A, 40B, and 40C correspond to consecutive transmission blocks $\bar{u}_\mu(k)$ 16 at the output of one of training symbol insertion units 15 with block index k=0, k=1, and k=2, respectively. Generally, each transmission block 40A-40C includes space-time encoded information bearing symbols 42A-C, null subcarriers 44A-44C, and training symbols 46A-46C, respectively. In particular, training symbol insertion units 15 insert blocks of $N_t+1$ training symbols 46A-46C according to equation (26) as a preamble to space-time encoded blocks of information-bearing symbols 42A-C. In some embodiments, training symbols 46A-46C are inserted every N+L transmitted symbols, where a cyclic prefix of L symbols is inserted by cyclic prefix insertion unit 19, resulting in a bandwidth efficiency of $(N-N_t-1)/(N+L)$. Additionally, the number of training symbols inserted may be adjusted depending on the channel's coherence time and the pertinent burst duration Null subcarriers 44A-44C are inserted within transmission blocks 40A-C, respectively, by applying the hopping code given in equation (8) so that the position of null subcarriers 44A-44C change from block to block. In some embodiments, N-K null subcarriers are inserted with hop-step N/(L+1) in each transmission block 40A-C. Additionally, null subcarriers may be inserted in accordance with conventional OFDM standards such as IEEE 802.11a and IEEE 802.11g resulting in easily implemented, low-complexity systems.

Figure 4:
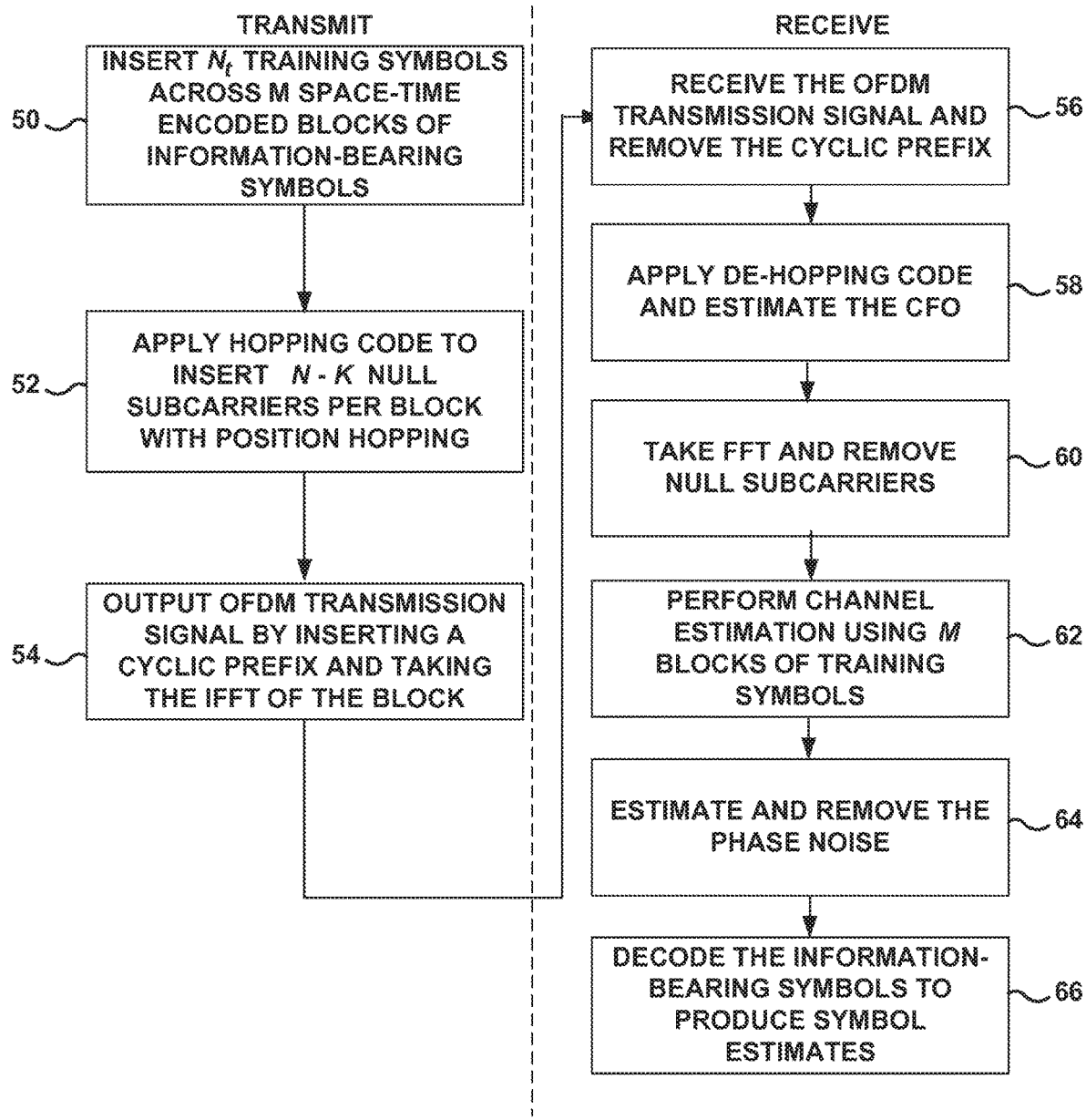
FIG. 4 is a flowchart illustrating an example mode of operation of the communication system of FIG. 2 in which a receiver performs CFO estimation and channel estimation on an OFDM transmission signal output by a transmitter.

FIG. 4 is a flowchart illustrating an example mode of operation of communication system 2 in which receiver 6 performs CFO, channel, and phase noise estimation on an OFDM transmission signal output by transmitter 4. Generally, transmitter 4 inserts $N_t$ training symbols across M space-time encoded blocks of information-bearing symbols (step 50). The training symbols are inserted as a sequence of blocks of training symbols $b_\mu(k)$ as described herein. In some embodiments, the number of training symbols inserted may be adjusted depending on the channel's coherence time and the pertinent burst duration. Additionally, transmitter 4 may insert two or more training symbols per block of space-time encoded information-bearing symbols by applying a first and a second permutation matrix, $P_A$ and $P_B$ respectively, as described previously. After inserting the training symbols, transmitter 4 applies a hopping code to insert N-K null subcarriers per block such that the position of the null subcarriers changes from block to block (step 52). The hopping code may be defined as in equation (8) with hop-step N/(L+1). It may be particularly advantageous to insert null subcarriers in accordance with conventional OFDM standards such as IEEE 802.11a and IEEE 802.11g. Transmitter 4 then outputs an OFDM transmission signal by first inserting a cyclic prefix and taking the IFFT of the resulting block of training and information-bearing symbols (step 54).

Receiver 6 receives the OFDM transmission signal and removes the cyclic prefix (step 56). Receiver 6 then applies a de-hopping code and estimates the CFO (step 58). The de-hopping code rearranges the null subcarriers so that the null subcarriers in different blocks are at the same position in their respective blocks, and the CFO is estimated as described previously. Because of the null subcarrier hopping, the CFO estimation and channel estimation can be separated and the CFO can be estimated over the full acquisition range $[-\pi, \pi)$. The FFT is taken and the null subcarriers are removed (step 60) by multiplying $\bar{y}_v(k)$ 30 with zero padding matrix $T_{zp}^T$ to obtain $z_v(k)$ 32. Channel estimation is performed over M blocks of training symbols (step 62). As described previously, each training block length $N_b$ can be smaller than $N_t(L+1)$ by sparsely distributing training symbols across M blocks. In some embodiments, one of a LMMSE channel estimator or a LS channel estimator may be applied to the M Blocks to estimate channel 8. In order to improve the BER performance of receiver 6, the phase noise is estimated and removed (step 64) based on the observations from $N_r$ receive antennas on a per block basis. Symbol estimates are then produced by decoding the space-time encoded information-bearing symbols (step 66).

FIGS. 5-12 are graphs that present simulations of OFDM transmissions over MIMO frequency-selective channels using the described techniques for estimating the CFO, channel, and phase noise. In order to benchmark the performance of the techniques described herein, the Crame'r -Rao lower bounds (CRLB) for the CFO are derived. Starting from the model of communication system 2 given in equation (12), the CRLB for $\omega_0$ is given according to equation (30), where $D(k):=\text{diag}[Pk+L, \ldots, P(k+1)-1]$, and $R_{gg}^{(v)}:=E[g_v(k) g_v^H(k)]$.

$$CRLB_\omega = \left( \frac{2}{\sigma_v^2} \sum_{v=1}^{N_r} \sum_{k=1}^{M-1} tr[D(k) F_N^H T_{zp} R_{gg}^{(v)} F_N D(k)] \right)^{-1} \quad (30)$$

It follows from equation (30) that as the number of blocks increases, the CRLB for CFO decrease. Similarly, the signal-to-noise ratio (SNR) versus CRLB decreases as the number of blocks increases. If N>>N-K, i.e. the number of subcarriers is much greater than the number of null subcarriers, $T_{zp} \approx I_N$. Assuming that $R_{gg}^{(v)} = \varepsilon I_N$, where $\varepsilon$ represents the average symbol energy, and P, M are sufficiently large equation (31) can be obtained.

$$CRLB_\omega = \frac{\sigma_v^2}{\varepsilon} \frac{3}{2(P-L)P^2 M^3 N_r} \quad (31)$$

Equation (31) explicitly shows that the CRLB of the CFO is independent of the channel and the number of transmit antennas, and that the CRLB of the CFO is inversely proportional to the SNR, the number of receive antennas, and the cube of the number of space-time data.

By assuming that CFO estimation is perfect, the performance of the channel estimator can be derived. If the LMMSE channel estimator given in equation (24) is used, then the mean-square error of the channel estimator is given according to equation (32).

$$\sigma_{lmmse}^2 = tr\left[\left(R_h^{-1} + \frac{M|b|^2}{N\sigma^2}I_{N_tN_r(L+1)}\right)^{-1}\right] \quad (32)$$

Similarly, if the LS channel estimator given in equation (25) is used, the corresponding mean-square error is given by equation (33).

$$\sigma_{ls}^2 = \frac{NN_tN_r(L+1)\sigma^2}{M|b|^2} \quad (33)$$

Equations (32) and (33) both imply that as the number of channels increases, the channel mean square error increases. However, this increase can be mitigated by collecting a greater number of blocks, i.e. more training symbols, provided that the CFO estimate is sufficiently accurate.

In all simulations, HIPERLAN/2 channel model B, given in Table 1, is used to generate the channels. The channel order is L=15 and the taps are independent with different variances. The OFDM block length is designed as N=64 as in HIPERLAN/2. The noise is additive white Gaussian noise with zero-mean and variance $\sigma_n^2$. The SNR is defined SNR=$\epsilon/\sigma_n^2$ and the information-bearing symbols are selected from a quadrature phase-shift keying (QPSK) constellation.

TABLE 1

| | tap no. | | | | | | |
|---|---|---|---|---|---|---|---|
| 0 | 1 | 2 | 3 | 4 | 5 | 6 | 7 |
| variance 2.60e−01 | 2.44e−01 | 2.24e−01 | 7.07e−02 | 7.93e−02 | 4.78e−02 | 2.95e−02 | 1.78e−02 |

| | tap no. | | | | | | |
|---|---|---|---|---|---|---|---|
| 8 | 9 | 10 | 11 | 12 | 13 | 141 | 15 |
| variance 1.07e−02 | 6.45e−03 | 5.01e−03 | 2.51e−03 | 0 | 1.48e−03 | 0 | 6.02e−04 |

Figure 5:
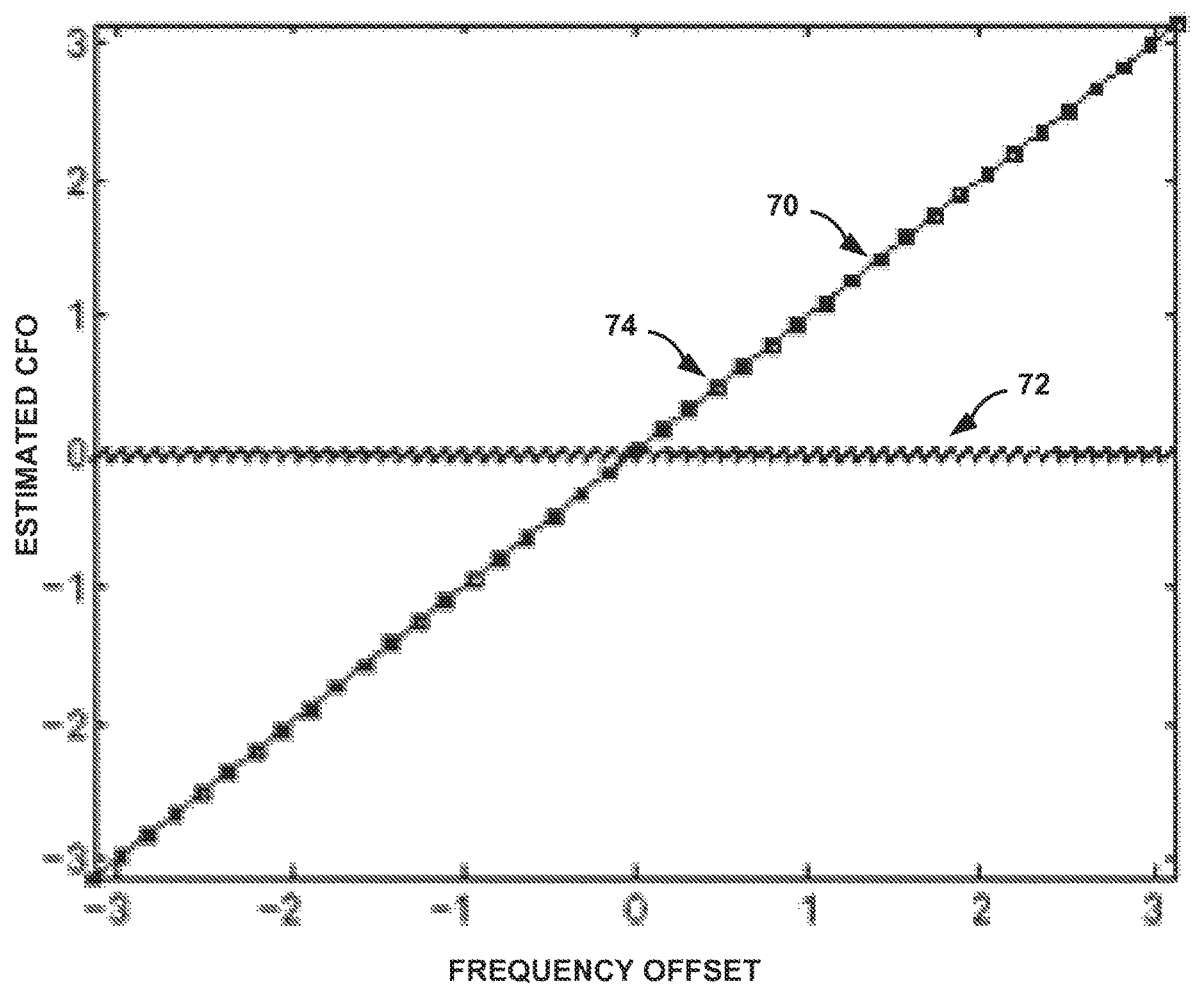
FIGS. 5-12 are graphs illustrating performance estimates of the CFO and channel estimation techniques described herein.

FIG. 5 is a graph comparing the true frequency offset versus the estimated CFO for the CFO estimation techniques described herein (plot 70) and an algorithm described in P. H. Moose, "A technique for orthogonal frequency division multiplexing frequency offset correction," IEEE Transactions on Communications, vol. 42, pp. 2908-1314, October 1994 (plot 72). The ideal line (74) is also shown for comparison and illustrates that the currently described CFO estimation techniques (plot 70) has the full acquisition range [−π, π), whereas the algorithm described in the P. H. Mooses reference (plot 72) has an acquisition range proportional to the OFDM block size N.

Figure 6:
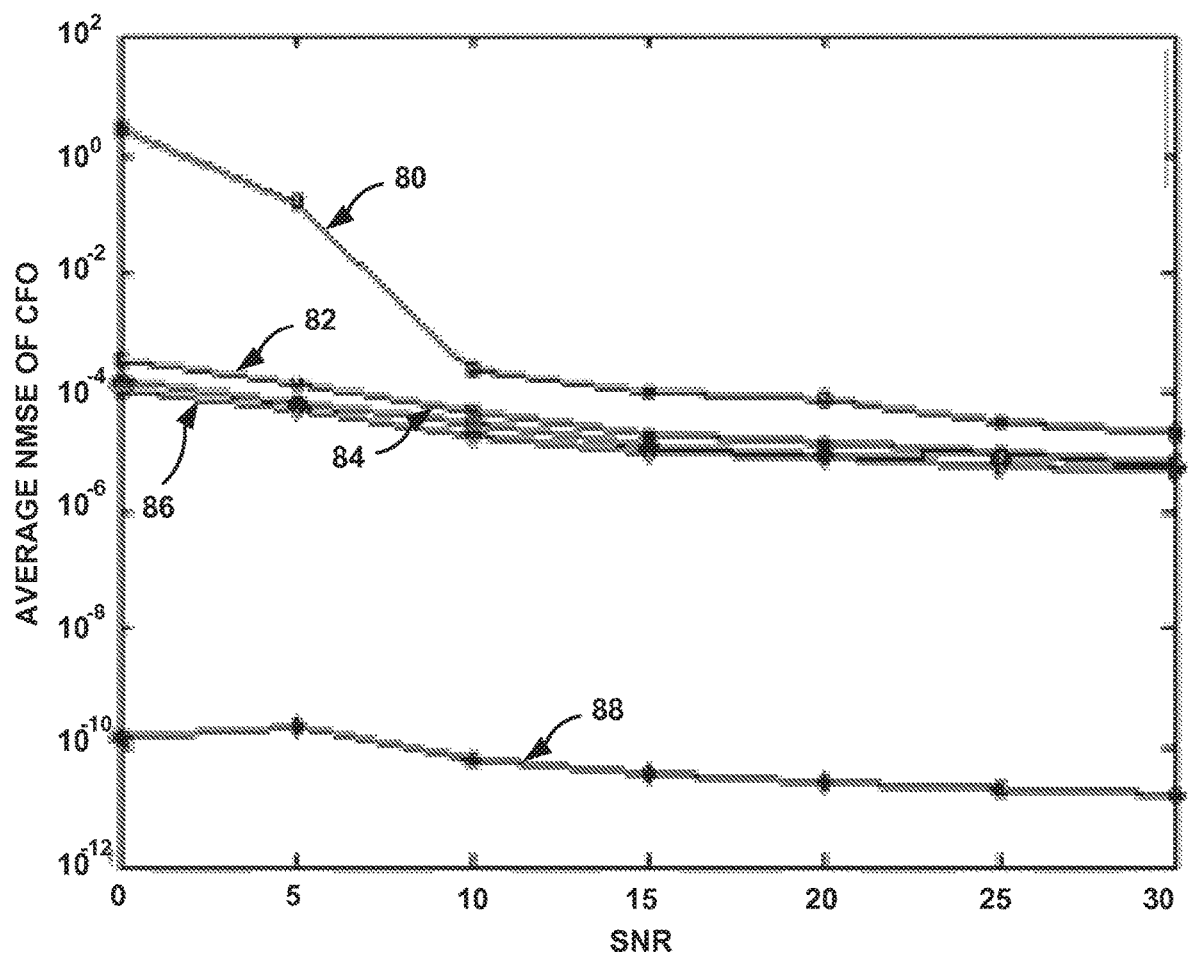

FIG. 6 is a graph comparing the effect of the number of blocks over which channel estimation is performed for the presently described CFO estimation techniques with $N_t$=2 and $N_r$=2. The CFO is ramdomly selected to in the range [−0.5π, 0.5π]. In each OFDM transmission block, there are four non-zero training symbols, 4 zero symbols to remove interference from other channels, and one zero symbol serving as a null subcarrier. The placement of the training symbols is in accordance with the techniques herein, and different numbers of blocks are use: M=L+1 (plot 80), M=K (plot 82), 2K (plot 84), 3K (plot 86), and the CRLB derived previously with M=K (plot 88) for comparison. FIG. 6 depicts the CFO normalized mean square error (NMSE), defined as $E[\|\hat{\omega}_0-\omega_0\|^2/\|\omega_0\|^2]$, verses SNR. As the number of OFDM blocks M increases, the NMSE of CFO decreases. However, the improvement is relatively small, which suggests that using M=K OFDM blocks is sufficient to estimate the CFO.

Figure 7:
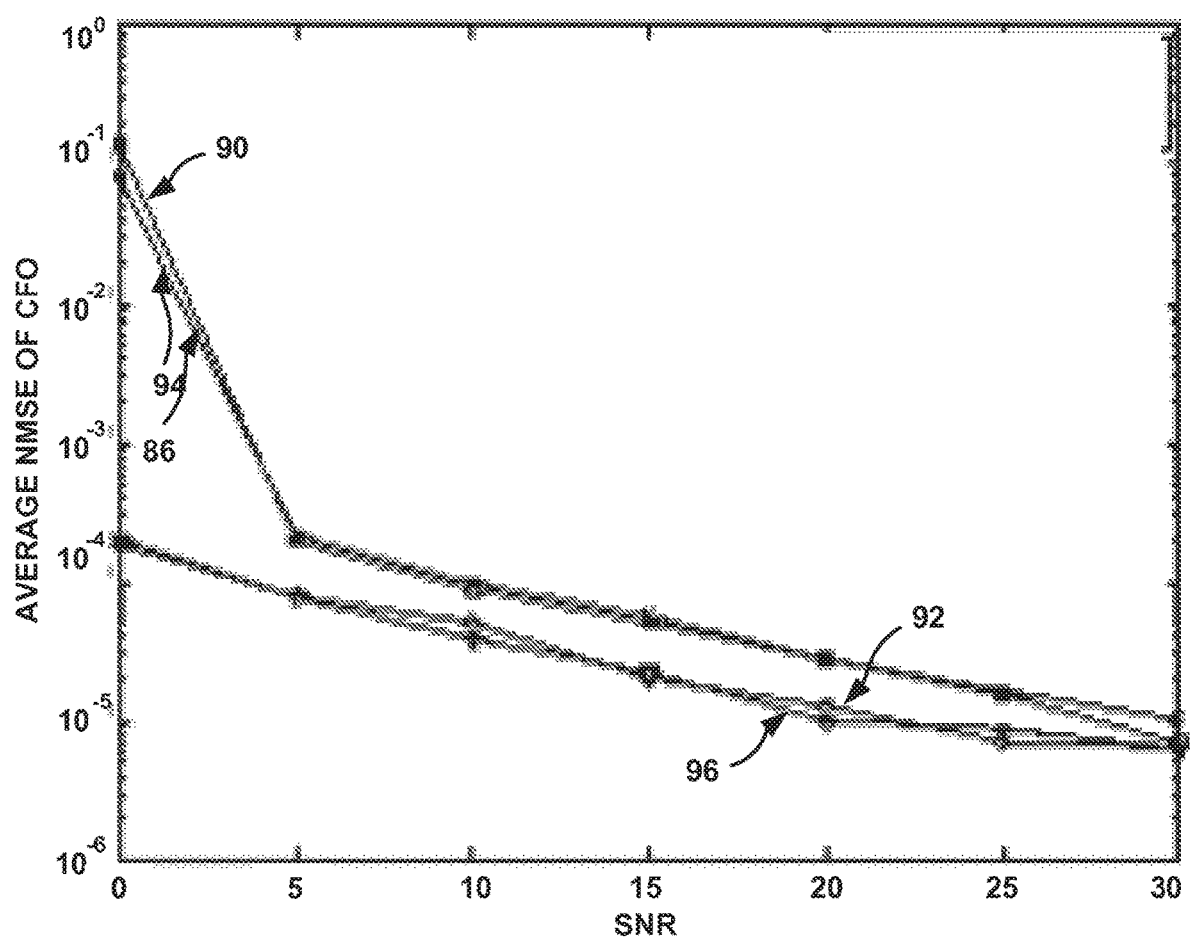

FIG. 7 is a graph comparing the effect of the number of antennas on CFO estimation using the LS channel estimator given in equation (25). The average NMSE of the CFO with the number of blocks M=N are plotted as lines 90, 92, 94, and 96 for systems having ($N_t$, $N_r$)=(1, 1), ($N_t$, $N_r$)=(1, 2), ($N_t$, $N_r$)=(2, 1), ($N_t$, $N_r$)=(2, 2), respectively. For plots 90 and 92 4 non-zero pilot symbols and one null subcarrier per OFDM transmission block are used. FIG. 7 illustrates that as the number of receive antennas increases, the performance of the CFO estimation techniques described herein increases due to the receive-diversity gains.

Figure 8:
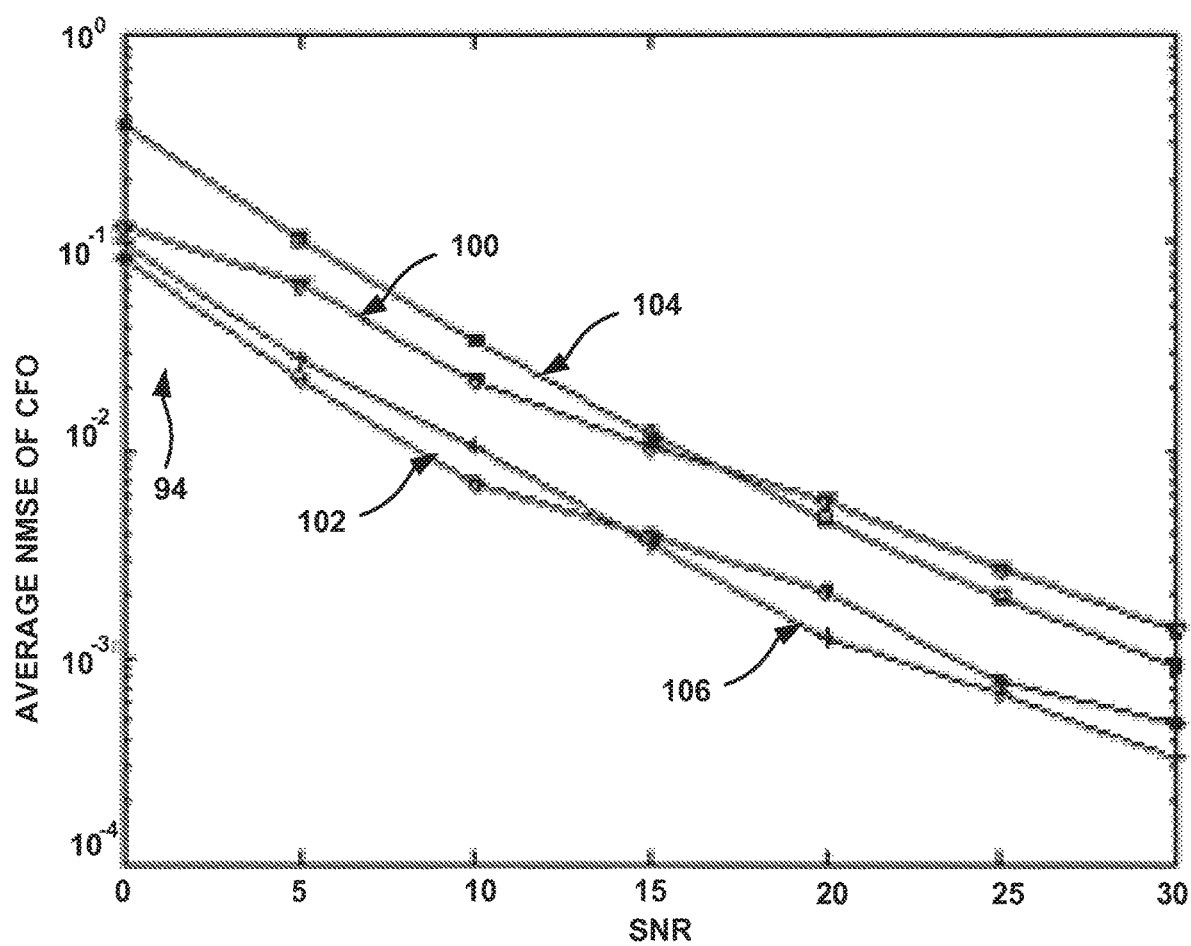

FIG. 8 is a graph comparing the CFO estimation techniques described herein with a technique described in M. Morelli and U. Mengali, "An improved frequency offset estimator for OFDM applications," IEEE Communications Letters, vol. 3, pp. 75-77, March 1999, for the single antenna case. For the presently described techniques, one non-zero training symbol and one zero training symbol for each block are used for each OFDM transmission block and 64 blocks are collected to perform CFO estimation. In order to maintain the same transmission rate, M. Morelli's and U. Mengali's previously referenced technique has a training block length of 128 with 8 identical parts. FIG. 8 depicts two cases: random CFO in [−0.06π, 0.06π] and fixed CFO with $\omega_0$=π/128. In both cases the CFO is chosen within the acquisition range of M. Morelli and U. Mengali's previously referenced technique. In both cases, the CFO techniques described herein, 100 and 102 for the fixed CFO case and the varying CFO case, respectively, are comparable with M. Morelli and U. Mengali's technique for the fixed CFO case 104 and varying CFO case 106.

Figure 9:
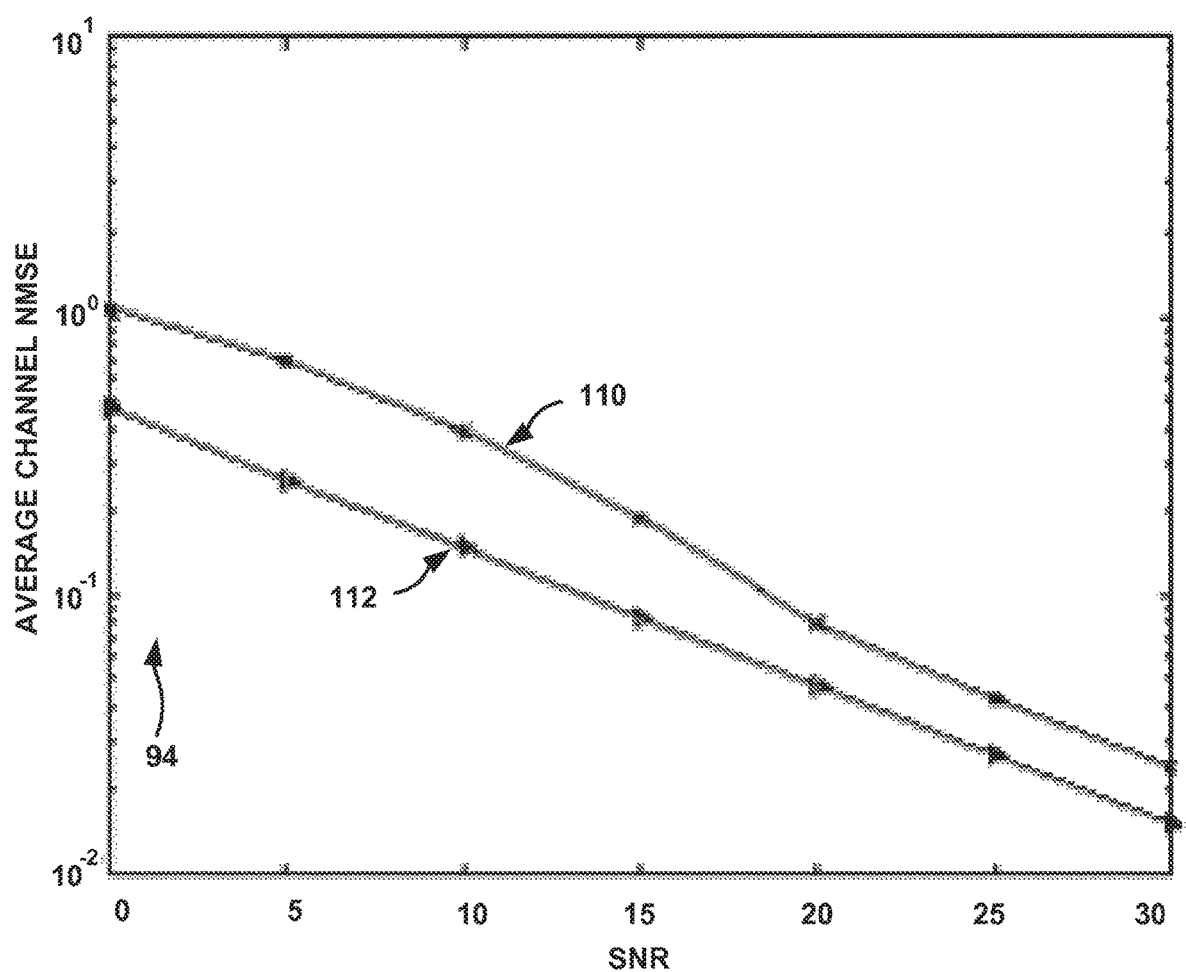

FIG. 9 is a graph comparing the performance of MIMO channel estimation with ($N_t$, $N_r$)=(2, 2) and the CFO being randomly selected in the range [−0.5π, 0.5π]. By collecting 64 observations from 8 OFDM transmission blocks and using the LS channel estimator given in equation (25), the MIMO channels can be estimated. In order to measure the channel estimation quality, the average channel NMSE is computed as $E[\|\hat{h}-h\|^2/\|h\|^2]$, where $\hat{h}$ is obtained using the LS method. The performance for MIMO OFDM transmissions with estimated CFO 110 using the techniques described herein are compared with the ideal case in which the CFO is perfectly known 112. FIG. 9 illustrates a 4.5 dB loss due to the CFO estimation error.

Figure 10:
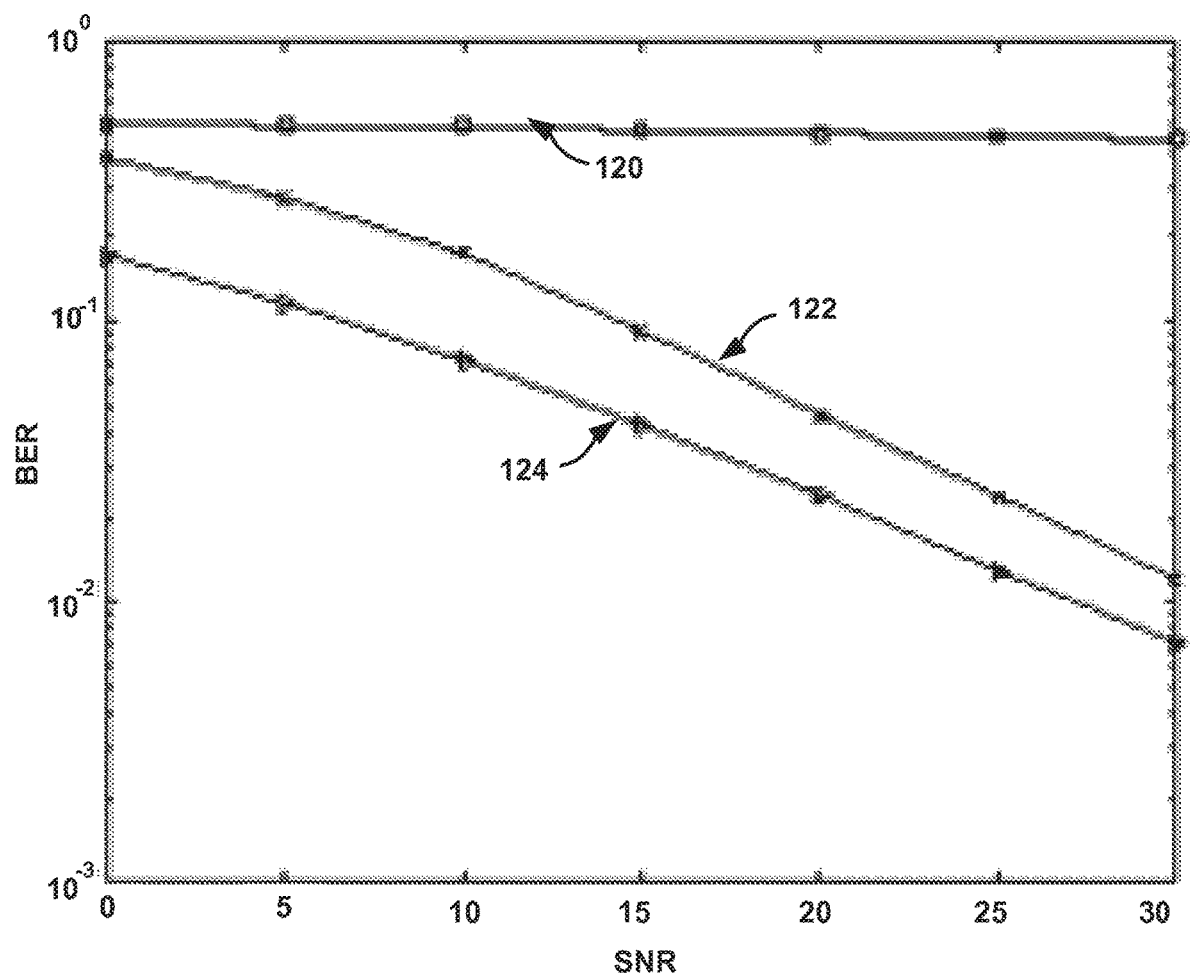

FIG. 10 compares the BER performance of the CFO and channel estimation techniques described herein without phase noise estimation (plot 120), with phase noise estimation (plot 122), and with perfect phase noise estimation (plot 124) with increasing SNR. The simulation parameters are the same as those used in FIG. 9 and zero-forcing equalization is used to estimate the information-bearing symbols. The BER performance of all the simulations degrades as the number of blocks increase due to phase noise. As expected, the plot with phase noise estimation 122 performs better than the plot without phase noise estimation 120 and the plot with perfect phase noise estimation 124 provides a benchmark.

Figure 11:
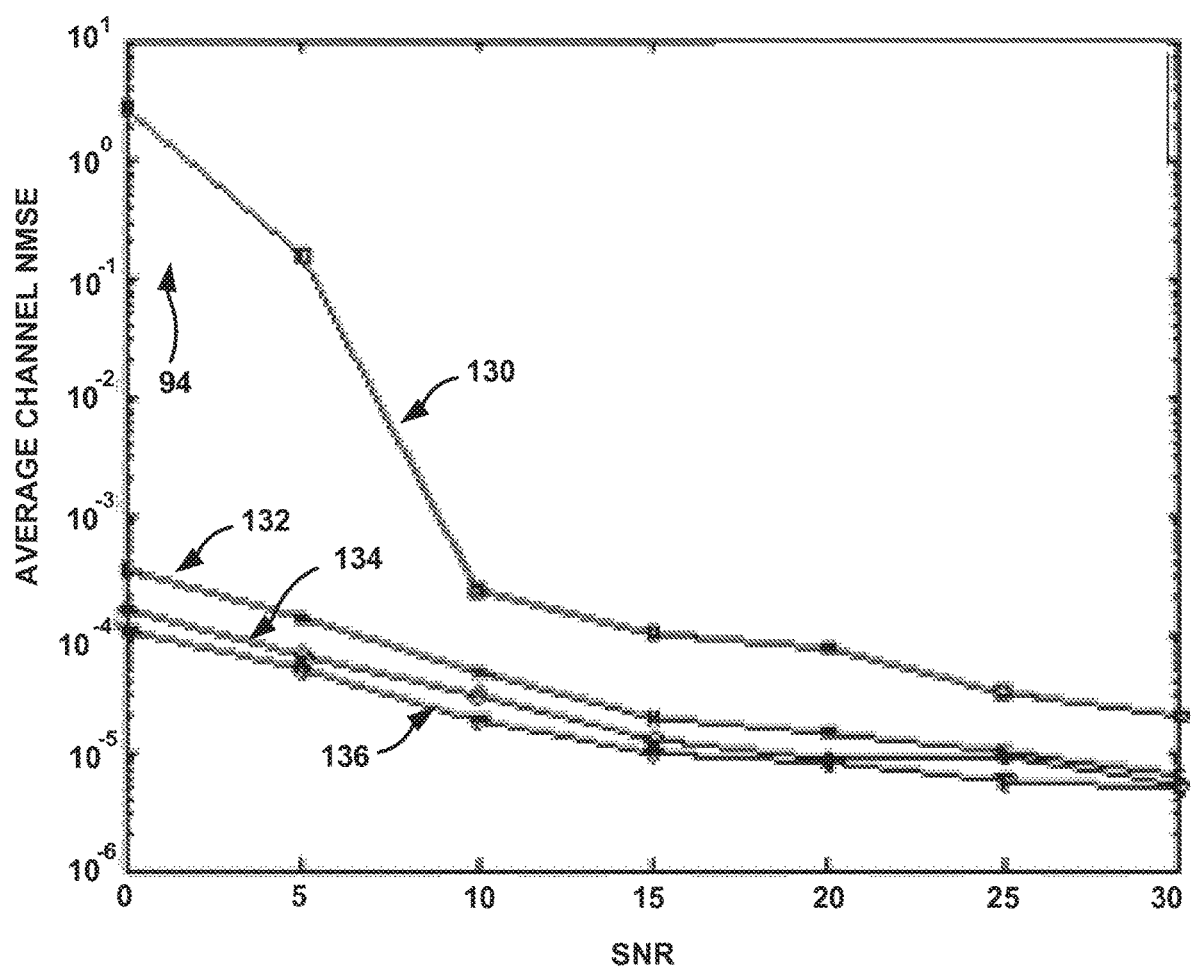
Figure 12:
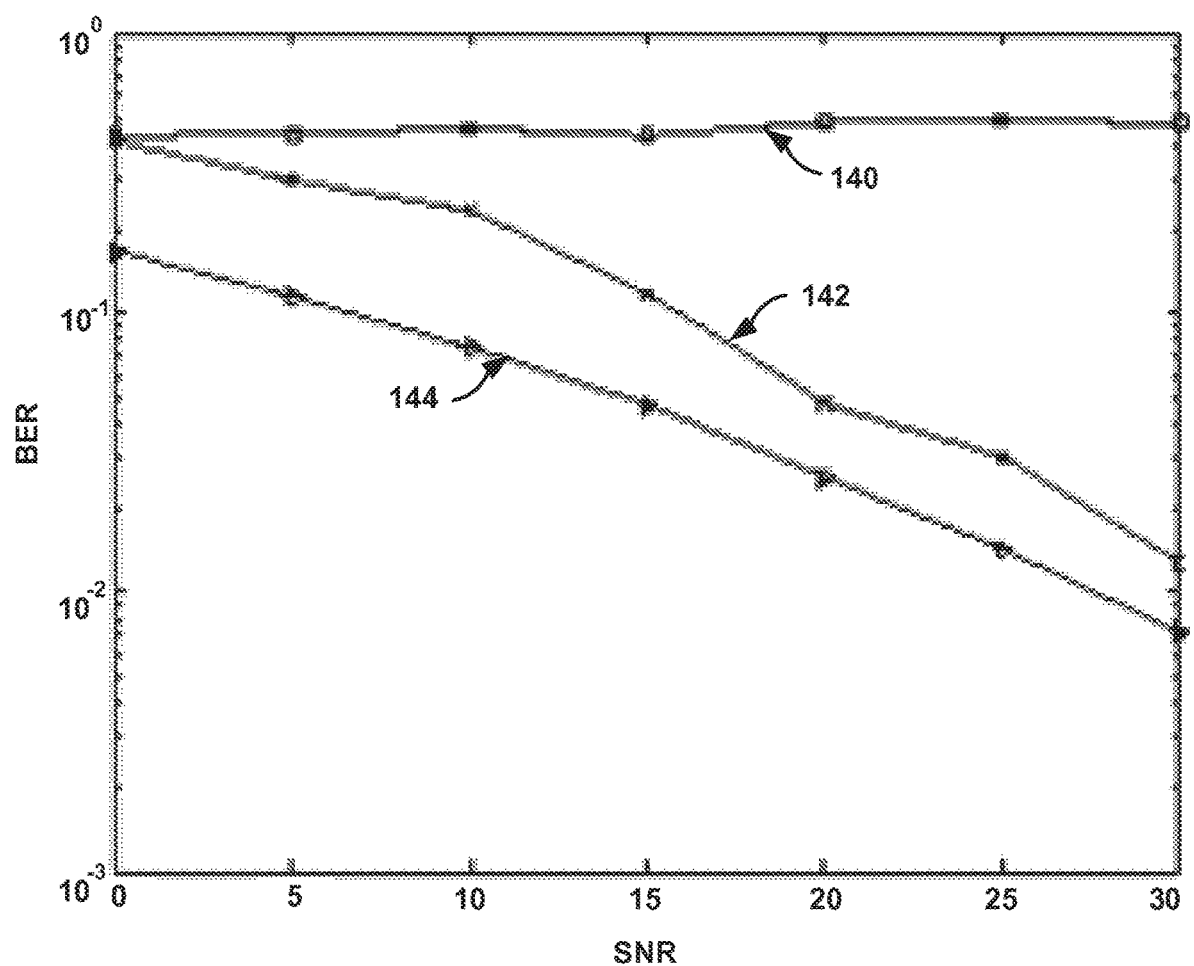

FIGS. 11 and 12 compare the estimation of $N_r$ CFOs in multi-user broadcast OFDM systems. Simulations are performed with $(N_t, N_r)=(2, 2)$ and CFOs are randomly selected in the range $[-0.5\pi, 0.5\pi]$. In particular, FIG. 11 illustrates the average channel NMSE with varying SNRs using a $N_r \times 1$ vector CFO estimator for the presently described techniques with M=L+1 (plot 130), M=K (plot 132), 2K (plot 134), 3K (plot 136). Similarly, FIG. 12 illustrates the BER performance with varying SNRs using the presently described CFO and channel estimation techniques without phase noise estimation (plot 140), with phase noise estimation (plot 142), and with perfect phase noise estimation (plot 144). FIGS. 11 and 12 illustrate results which corroborate with FIGS. 9 and 10 respectively. Consequently, the described techniques which were illustrated in detail for a single-user system involving $N_t$ transmit antennas and $N_r$ receive antennas, can be applied with similar results in a multi-user downlink scenario where the base station deploys $N_t$ transmit antennas to broadcast OFDM based transmissions to $N_r$ mobile stations each of which is equipped with one or more antennas.

Various embodiments of the invention have been described. The invention provides techniques for carrier frequency offset (CFO) and channel estimation of orthogonal frequency division multiplexing (OFDM) transmissions over multiple-input multiple-output (MIMO) frequency-selective fading channels. In particular, techniques are described that utilize training symbols in a manner that CFO and channel estimation are decoupled from symbol detection at the receiver. Unlike conventional systems in which training symbols are inserted within a block of space-time encoded information-bearing symbols to form a transmission block, the techniques described herein insert training symbols over two or more transmission blocks.

The described techniques can be embodied in a variety of transmitters and receivers used in downlink operation including cell phones, laptop computers, handheld computing devices, personal digital assistants (PDA's), and other devices. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer-readable instructions that when executed in a wireless communication device, cause the wireless communication device to carry out one or more of the techniques described herein. These and other embodiments are within the scope of the following claims.

The invention claimed is:

1. A method comprising:
    forming two or more blocks of output symbols for orthogonal frequency division multiplexing (OFDM) transmissions over two or more antennas, wherein the forming comprises encoding two or more blocks of information-bearing symbols for transmissions over the two or more antennas comprising encoding the two or more blocks of information-bearing symbols in space and time within the two or more blocks of output symbols, inserting training symbols within the two or more blocks of information-bearing symbols, and inserting null subcarriers within the two or more blocks of information-bearing symbols at positions determined by a hopping code, wherein the training symbols are inserted in a manner that enables carrier frequency offset estimation to be performed prior to channel estimation; and
    transmitting, via the two or more antennas, transmission signals in accordance with the two or more blocks of output symbols, wherein the two or more blocks of output symbols include a first block of output symbols and a second block of output symbols, and wherein transmitting the transmission signals comprises:
    transmitting, via a first antenna of the two or more antennas, a first transmission signal in accordance with the first block of output symbols; and
    transmitting, via a second antenna of the two or more antennas, a second transmission signal in accordance with the second block of output symbols.

2. The method of claim 1, wherein transmitting the transmission signals comprises inserting a cyclic prefix within each of the two or more blocks of output symbols.

3. The method of claim 1, wherein the training symbols are inserted in a manner that decouples carrier frequency offset estimation from symbol detection.

4. The method of claim 1, wherein the training symbols within the two or more blocks of information-bearing symbols collectively provide information for channel estimation.

5. A system comprising:
    two or more antennas; and
    a base station coupled with the two or more antennas, wherein the base station is configured to perform operations comprising:
        forming two or more blocks of output symbols for orthogonal frequency division multiplexing (OFDM) transmissions over the two or more antennas, wherein the forming comprises encoding two or more blocks of information-bearing symbols for transmissions over the two or more antennas comprising encoding the two or more blocks of information-bearing symbols in space and time within the two or more blocks of output symbols, inserting training symbols within the two or more blocks of information-bearing symbols, and inserting null subcarriers within the two or more blocks of information-bearing symbols at positions determined by a hopping code, wherein the training symbols are inserted in a manner that enables carrier frequency offset estimation to be performed prior to channel estimation; and
        transmitting, via the two or more antennas, transmission signals in accordance with the two or more blocks of output symbols, wherein the two or more blocks of output symbols include a first block of output symbols and a second block of output symbols, and wherein transmitting the transmission signals comprises (i) transmitting, via a first antenna of the two or more antennas, a first transmission signal in accordance with the first block of output symbols, and (ii) transmitting, via a second antenna of the two or more antennas, a second transmission signal in accordance with the second block of output symbols.

6. The system of claim 5, wherein transmitting the transmission signals comprises inserting a cyclic prefix within each of the two or more blocks of output symbols.

7. The system of claim 5, wherein the training symbols are inserted in a manner that decouples carrier frequency offset estimation from symbol detection.

8. The system of claim 5, wherein the training symbols within the two or more blocks of information-bearing symbols collectively provide information for channel estimation.

9. A method comprising:
forming two or more blocks of output symbols for orthogonal frequency division multiplexing (OFDM) transmissions over two or more antennas, wherein the forming comprises encoding two or more blocks of information-bearing symbols for transmissions over the two or more antennas comprising encoding the two or more blocks of information-bearing symbols in space and time within the two or more blocks of output symbols, and inserting null subcarriers within the two or more blocks of information-bearing symbols at positions determined by a hopping code, wherein the two or more blocks of output symbols comprise training symbols positioned in a manner that enables carrier frequency offset estimation to be performed prior to channel estimation; and
transmitting, via the two or more antennas, transmission signals in accordance with the two or more blocks of output symbols, wherein the two or more blocks of output symbols include a first block of output symbols and a second block of output symbols, and wherein transmitting the transmission signals comprises:
transmitting, via a first antenna of the two or more antennas, a first transmission signal in accordance with the first block of output symbols; and
transmitting, via a second antenna of the two or more antennas, a second transmission signal in accordance with the second block of output symbols.

10. The method of claim 9, wherein transmitting the transmission signals comprises inserting a cyclic prefix within each of the two or more blocks of output symbols.

11. The method of claim 9, wherein the two or more blocks of output symbols comprise training symbols positioned in a manner that decouples carrier frequency offset estimation from symbol detection.

12. A system comprising:
two or more antennas; and
a base station coupled with the two or more antennas, wherein the base station is configured to perform operations comprising:
forming two or more blocks of output symbols for orthogonal frequency division multiplexing (OFDM) transmissions over the two or more antennas, wherein the forming comprises encoding two or more blocks of information-bearing symbols for transmissions over the two or more antennas comprising encoding the two or more blocks of information-bearing symbols in space and time within the two or more blocks of output symbols, and inserting null subcarriers within the two or more blocks of information-bearing symbols at positions determined by a hopping code, wherein the two or more blocks of output symbols comprise training symbols positioned in a manner that enables carrier frequency offset estimation to be performed prior to channel estimation; and
transmitting, via the two or more antennas, transmission signals in accordance with the two or more blocks of output symbols, wherein the two or more blocks of output symbols include a first block of output symbols and a second block of output symbols, and wherein transmitting the transmission signals comprises (i) transmitting, via a first antenna of the two or more antennas, a first transmission signal in accordance with the first block of output symbols, and (ii) transmitting, via a second antenna of the two or more antennas, a second transmission signal in accordance with the second block of output symbols.

13. The system of claim 12, wherein transmitting the transmission signals comprises inserting a cyclic prefix within each of the two or more blocks of output symbols.

14. The system of claim 12, wherein the two or more blocks of output symbols comprise training symbols positioned in a manner that decouples carrier frequency offset estimation and channel estimation from symbol detection.

15. A method comprising:
forming two or more blocks of output symbols for orthogonal frequency division multiplexing (OFDM) transmissions over two or more antennas, wherein the forming comprises encoding two or more blocks of information-bearing symbols for transmissions over the two or more antennas comprising encoding the two or more blocks of information-bearing symbols in space and time within the two or more blocks of output symbols, and inserting training symbols within the two or more blocks of information-bearing symbols, wherein the training symbols are inserted in a manner that enables carrier frequency offset estimation to be performed prior to channel estimation; and
transmitting, via the two or more antennas, transmission signals in accordance with the two or more blocks of output symbols, wherein the two or more blocks of output symbols include a first block of output symbols and a second block of output symbols, and wherein transmitting the transmission signals comprises:
transmitting, via a first antenna of the two or more antennas, a first transmission signal in accordance with the first block of output symbols; and
transmitting, via a second antenna of the two or more antennas, a second transmission signal in accordance with the second block of output symbols.

* * * * *